(12) United States Patent
Mesaros

(10) Patent No.: US 7,181,419 B1
(45) Date of Patent: Feb. 20, 2007

(54) DEMAND AGGREGATION SYSTEM

(75) Inventor: Gregory J. Mesaros, Westlake, OH (US)

(73) Assignee: eWinWin, Inc., Westlake, OH (US)

( * ) Notice: Subject to any disclaimer, the term of this patent is extended or adjusted under 35 U.S.C. 154(b) by 664 days.

(21) Appl. No.: 10/243,456

(22) Filed: Sep. 13, 2002

Related U.S. Application Data

(60) Provisional application No. 60/318,789, filed on Sep. 13, 2001.

(51) Int. Cl.
*G06Q 30/00* (2006.01)
(52) U.S. Cl. ....................................................... 705/26
(58) Field of Classification Search .................. 705/14, 705/26
See application file for complete search history.

(56) References Cited

U.S. PATENT DOCUMENTS

| | | | |
|---|---|---|---|
| 6,604,089 B1 * | 8/2003 | Van Horn et al. ............. | 705/26 |
| 6,915,275 B2 * | 7/2005 | Banerjee et al. .............. | 705/26 |
| 2001/0047296 A1 * | 11/2001 | Wyker et al. ................. | 705/14 |
| 2001/0047311 A1 * | 11/2001 | Singh ........................... | 705/26 |
| 2002/0026351 A1 * | 2/2002 | Coleman ....................... | 705/14 |
| 2002/0046147 A1 * | 4/2002 | Livesay et al. ................ | 705/37 |
| 2002/0091580 A1 * | 7/2002 | Wang ............................ | 705/26 |
| 2002/0107773 A1 * | 8/2002 | Abdou et al. .................. | 705/37 |
| 2002/0116282 A1 * | 8/2002 | Martin et al. ................. | 705/26 |
| 2002/0165771 A1 * | 11/2002 | Walker et al. ................. | 705/14 |
| 2003/0167222 A1 * | 9/2003 | Mehrotra et al. ............. | 705/37 |
| 2005/0038713 A1 * | 2/2005 | Pickard et al. ................ | 705/26 |
| 2006/0095366 A1 * | 5/2006 | Sheth et al. .................. | 705/37 |

FOREIGN PATENT DOCUMENTS

WO  WO-9821713 A2 * 5/1998

OTHER PUBLICATIONS

Lamparter, W.C., "Natural Selection," American Printer, vol. 217, No. 3, pp. 54-64, Jun. 1996.*
Merriam-Webster's Collegiate Dictionary, Tenth Edition, 1997, p. 732.*
Anon., "The Oil & Gas Asset Clearinghouse, a Petroleum Place Company, to Host Its Second Exclusively Online Auction of Oil & Gas Properties on Aug. 14-16, 2000," PR Newswire, p. 5591, Aug. 3, 2000.*
Anon., "Screen Savers," Lawyer, Feb. 19, 2001.*

* cited by examiner

*Primary Examiner*—Nicholas D. Rosen
(74) *Attorney, Agent, or Firm*—Amin, Turocy, & Calvin, LLP

(57) ABSTRACT

The demand aggregation system includes buyer sponsored DealRooms, seller sponsored DealRooms, and multiple buyer and multiple seller sponsored DealRooms. Moreover, the demand aggregation system includes a customer relations management (CRM) package. In the CRM package, information on buyer and prospective buyers are loaded into a database that can include information such as: individual name; company name and address; email address; phone number; cell number; products purchased; volumes; time of purchase. Further the CRM package can be integrated with the demand aggregation system as well as a customer resource planning system (e.g., MRP, ERP).

18 Claims, 25 Drawing Sheets

PRODUCT: GLASS

BUYER'S PRODUCT ORDERING CRITERIA

166 —
ENTER PRICE RANGE: ____ - ____ (dollars/pound)

168 —
ENTER VOLUME RANGE: ____ - ____ (pounds)

170 —
ENTER DELIVERY RANGE: ____ - ____ (days)

172 —
ENTER ACCEPTABLE % DEFECTS: ____ (percent)

174 —
ENTER MINIMUM WARRANTY: ____ (months)

LIST SELLERS PREVIOUSLY USED BUYER

SELLER #1
SELLER #2
SELLER #3
SELLER #4

176

178 — SEARCH FOR DEAL

BUYER REGISTRATION

BUYER NAME:

ADDRESS:

PRIMARY CONTACT:

TELEPHONE:

FAX:

E-MAIL:

DESCRIPTION OF COMPANY:

PREFERRED USER NAME:

PREFERRED PASSWORD:

PREFERRED PASSWORD (VERIFICATION):

Fig. 6

| BUYER DATA NAME, ADDRESS, CONTACT, ETC. | USER NAME | PASSWORD | CREDIT CARD NO. & EXP. |
|---|---|---|---|
| BUYER 1 | USER NAME (1) | PASSWORD (1) | XXXXXXXX EXP. 05/03 |
| . . . | . . . | . . . | . . . |
| BUYER (N) | USER NAME (N) | PASSWORD (N) | CREDIT CARD (N) |

```
SELLER REGISTRATION

SELLER NAME:

ADDRESS:

PRIMARY CONTACT:

TELEPHONE:

FAX:

E-MAIL:

DESCRIPTION OF COMPANY:

PREFERRED USER NAME:

PREFERRED PASSWORD:

PREFERRED PASSWORD (VERIFICATION):
```

Fig. 10

| SELLER DATA NAME, ADDRESS, CONTACT, ETC. | USER NAME | PASSWORD | CREDIT CARD NO. & EXP. |
|---|---|---|---|
| SELLER 1 | USER NAME (1) | PASSWORD (1) | XXXXXXXXX EXP. 07/03 |
| . . . | . . . | . . . | . . . |
| SELLER (N) | USER NAME (N) | PASSWORD (N) | CREDIT CARD (N) |

DEMAND AGGREGATION SYSTEM

RELATED APPLICATIONS

This application claims the benefit of copending U.S. provisional application Ser. No. 60/318,789, filed on Sep. 13, 2001, the entirety of which is incorporated herein by reference.

TECHNICAL FIELD

The present invention relates to a demand aggregation system and more particularly to a system and method of employing various features within the demand aggregation system.

BACKGROUND OF THE INVENTION

The buying and selling of products and services has resulted in a vast array of buying schemes which are used to vary the price at which such products are sold. A common buying scheme, which businesses encounter regularly, is known as volume buying. According to this buying scheme, sellers set a fixed unit price for their products based on the volume of units that a buyer is willing to purchase. Buyers desiring to purchase products from the seller are each required to pay the same fixed price depending on the volume of units the buyer is purchasing. If a seller finds that the demand for a given product is greater or less than expected, the seller may later adjust the fixed price per unit of the product to account for such findings. Although the fixed price per unit system provides a simple way for a seller to conduct business with multiple buyers, one drawback of this buying scheme is that it fails to provide buyers with a choice between a variety of different buying criteria that may be just as important as or more important to the buyer than price.

For example, a buyer that is in need of goods, such as raw materials to make products for an expedited order may be willing to pay a higher price for a faster delivery time. Another buyer may be concerned with the quality of the goods they are purchasing, such that the buyer would pay a higher price for goods having a minimum number of defects. Yet another buyer may be concerned with the warranty time allotted for the goods they are purchasing, and may want the warranty of the goods that they are purchasing to match or exceed the warranty the buyers are offering their own customers.

Yet another buying scheme which has been advanced in recent years is buyer-driven bidding. According to this buying scheme, a single buyer desiring to obtain a product communicates a price at which the buyer is willing to purchase the product to multiple sellers. Each of the sellers is provided an opportunity to review the buyer's price. A sale is complete when one of the sellers agrees to sell the product to the buyer at the price suggested by the buyer. While the buyer-driven bidding scheme provides advantages for certain types of transactions when, for example, sellers may be willing to sell products at lower than normal prices, the uncertainties involved with whether a buyer's offer will be accepted is often problematic for high volume commercial transactions in which the reliability that a transaction will be complete is of paramount importance. Another problem with the present buying schemes is that the buyers have no control in determining the criteria of the product or services that they may receive, while the seller has no control of the type of purchase that the buyer's request.

SUMMARY OF THE INVENTION

A demand aggregation system is structured to provide incentive for buyers to work together when purchasing products. By working together, buyers are able to take advantage of lower pricing due to quantity discounts. To facilitate buying and selling products using the volume pricing methodology, an electronic forum is provided whereby buyers and sellers are able to conveniently exchange information and order products.

In accordance with an aspect of the present invention a buyer or a plurality of buyers may sponsor a deal room to aggregate purchasing goods/services from a plurality of sellers. For example, a buyer can license a DealRoom and request that suppliers respond to an online offer. With a pre-approved name and password (from the registration page completed by the supplier), the supplier can see the offer with offer details and/or a specification. The supplier can choose to agree to accept terms of the specification; alternatively, the supplier can make a change to the offer and submit such changes for the buyer's review.

In accordance with another aspect of the present invention, buyers and sellers may concurrently sponsor a deal room/transaction to aggregate selling of and purchasing of goods/services by a plurality of sellers and buyers respectively. For example, multiple sellers and buyers may employ the present invention to create a deal room/transaction forum where a plurality of sellers and buyers may assemble to aggregate selling and buying of specific goods and/or services that the sellers wish to sell and the buyers desire to purchase. Such a transaction forum creates efficiencies with respect to purchase price and/or selling quantity of particular goods/services.

The demand aggregation system can include a customer relations management (CRM) package. In the CRM package, information on buyers and prospective buyers are loaded into a database that can include information such as: individual name; company name and address; email address; phone number, cell number; products purchased; volumes; time of purchase. Further the CRM package can be integrated with the demand aggregation system as well as a customer resource planning system (e.g., MRP, ERP).

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

BRIEF DESCRIPTION OF THE DRAWINGS

FIG. 4b illustrates a buyer's product ordering criteria input screen in accordance with one aspect of the present invention;

FIG. 6 illustrates an on-line registration form for a buyer in accordance with one aspect of the present invention;

FIG. 7 illustrates a buyer database stored in a central server in accordance with one aspect of the present invention;

FIG. 10 illustrates an on-line registration form for a seller in accordance with one aspect of the present invention;

FIG. 11 illustrates a seller database stored in the central server in accordance with one aspect of the present invention;

DETAILED DESCRIPTION OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, both an application running on a server and the server can be a component.

Figure 1:
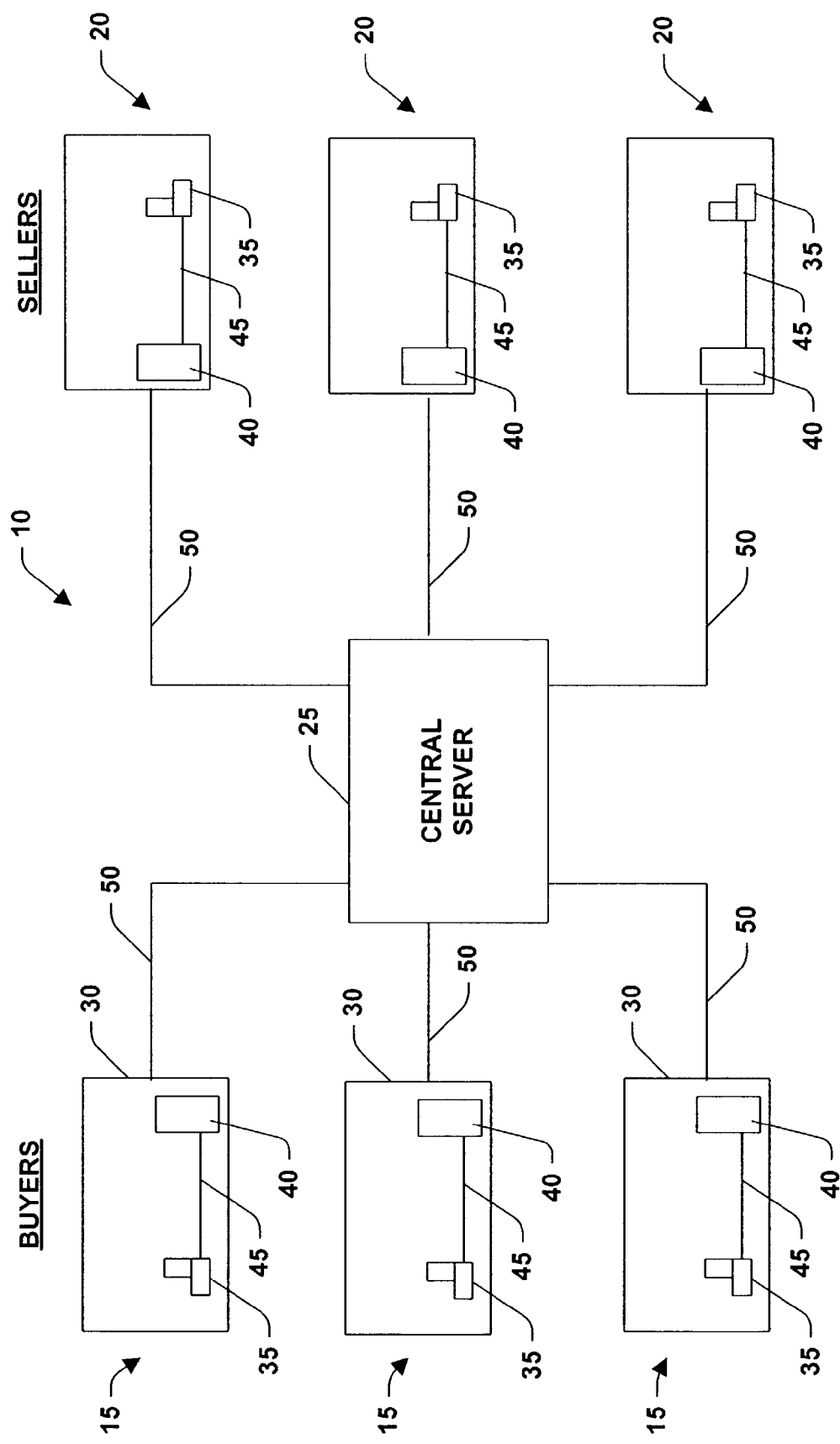
FIG. 1 illustrates a diagrammatic view of a system for electronically conducting business in accordance with one aspect of the present invention.

Referring initially to FIG. 1, a demand aggregation system 10 is shown in which multiple buyers 15 and sellers 20 are electronically linked via a central server 25. As discussed in more detail below, the central server 25 is configured to provide the buyers 15 and sellers 20 with a convenient forum in which to buy and sell goods in accordance with an aspect of the present invention. The forum may, for example, be a preestablished Internet web page where sellers 20 can post product information and the buyers 15 can order products. The multiple criteria buying scheme calls for a seller 20 to post a number of deals for a given product, which vary according to different offering criteria defining the limits of a number of selling criteria, such as, for example, price, volume, quality and delivery time. The buyers 15 can enter a range of criteria that the buyer would require for a deal to be made. A list of sellers and prospective deals offered by sellers 20 is generated for the buyers 15 to review. The buyers 15 can then review the list of deals and choose a deal based on the buyers' 15 particular needs. In this manner, the buyers 15 can be certain that particular thresholds have been met.

It is to be appreciated that the present invention has wide applicability to the purchasing and/or selling of a variety of different products and/or services. For example, the present invention may be applied within the context of purchasing and/or selling airline tickets wherein buyers' criteria may include, for example: (1) reputation of airline; (2) reliability; (3) timeliness; (4) price; (5) number of alternative flights; (6) comfort; (7) quality of service; and (8) quality of foods. The sellers' criteria may include, for example: (1) volume of tickets; (2) buyer's versatility in time schedule; (3) buyer's method of payment, etc.

The present invention may also be applied in the context of purchasing and/or selling an automobile wherein buyer's criteria may include, for example: (1) reputation of automobile manufacturer; (2) reputation of dealer; (3) price of automobile; (4) delivery options; (5) automobile availability; (6) safety; and (7) financing terms; etc. While, the seller's criteria may include, for example: (1) buyer's creditworthiness; (2) desired finance terms; (3) delivery requests of buyer; (4) delivery dates; etc.

Thus, the present invention allows buyers and/or sellers of products and/or services to pre-select a plurality of criteria prior to negotiating a deal for the product and/or service. Of course the pre-selected criteria will vary depending on the particular product and/or service. The scope of the present invention as defined in the hereto appended claims intends to include any product and/or service (and plurality of pre-selected criteria associated therewith) suitable for deal-making in accordance with the present invention.

Each of the buyers 15 and sellers 20 may access the central server 25 in any of a variety of ways. For example, in the present aspect, each buyer 15 and seller 20 is shown to be part of separate establishments 30 which include one or more respective computer systems 35 and local servers 40. The computer systems 35 may, for example, be a desktop or laptop computer with a local area network (LAN) interface for communicating over a network backbone 45 to the local server 40. The local servers 40, in turn, interface with the central server 25 via a network cable 50 or the like. It will be appreciated that while the present aspect depicts the computer system 35 communicating with the central server 25 via hardwired network connections, in an alternative aspect the computer system 35 may interface with the central server 25 using a modem, wireless local area and/or wide area networks, etc. Further, it will be appreciated, that while the buyers 15 and sellers 20 are shown to communicate with the central server 25 via different computer systems 35, it will be appreciated that the buyers 15 and/or sellers 20 may access the central server 25 from the same computer system 25.

Figure 2A:
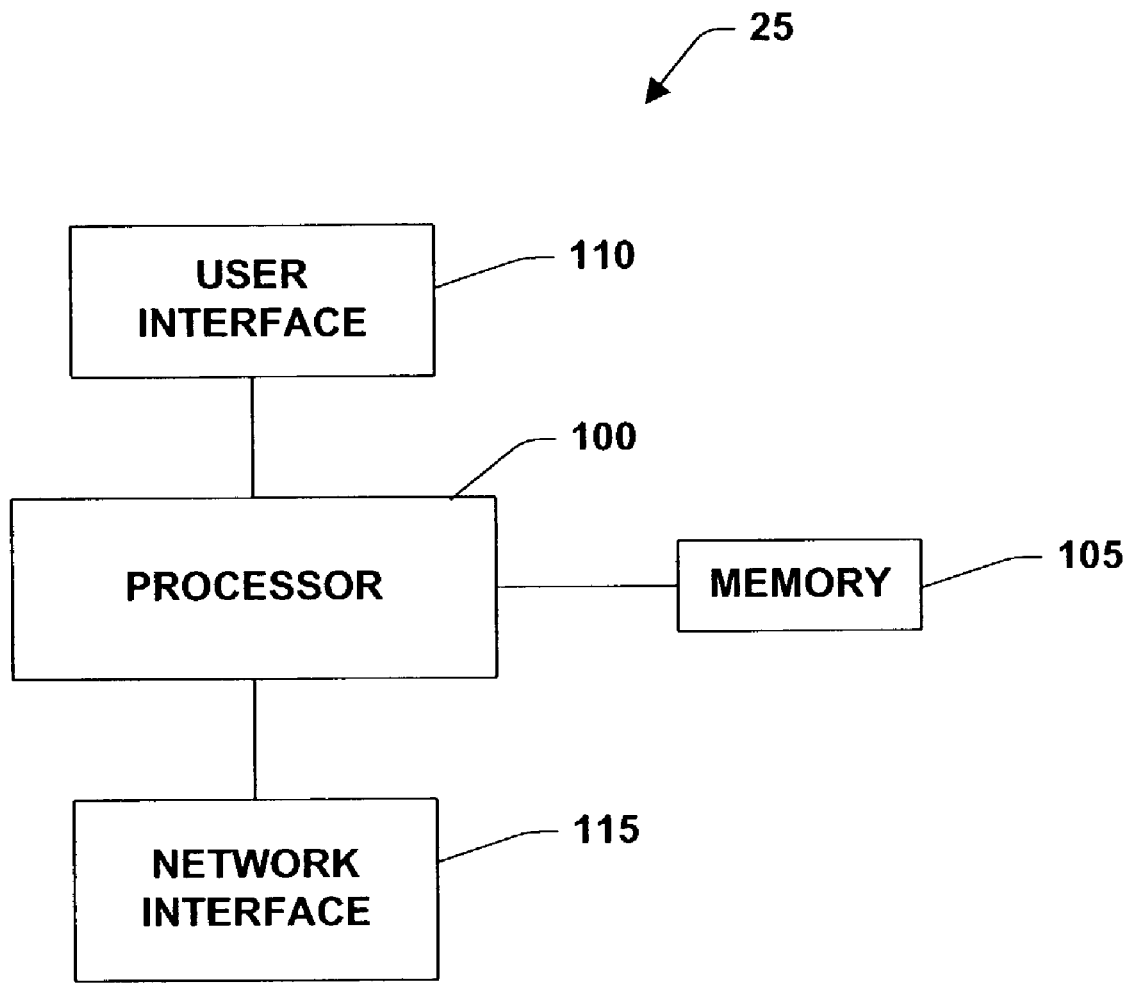
FIG. 2a illustrates a block diagram of a central server in accordance with one aspect of the present invention.

Turning now to FIG. 2a, a block diagram of hardware components of the central server 25 is shown. In particular, the central server 25 includes a central processor 100 for performing the various functions described herein. A memory 105 is coupled to the processor 100 and stores operating code and other data associated with the operations of the central server 25. A user interface 110 is also coupled to the processor 100 and provides an interface through which the central server 25 may be directly programmed or accessed. The user interface 110 may, for example, be an alphanumeric keyboard and mouse. A network interface 115 coupled to the processor 100 provides multiple connections for transceiving information with buyers 15 and sellers 20 over the network cables 50.

Figure 2B:
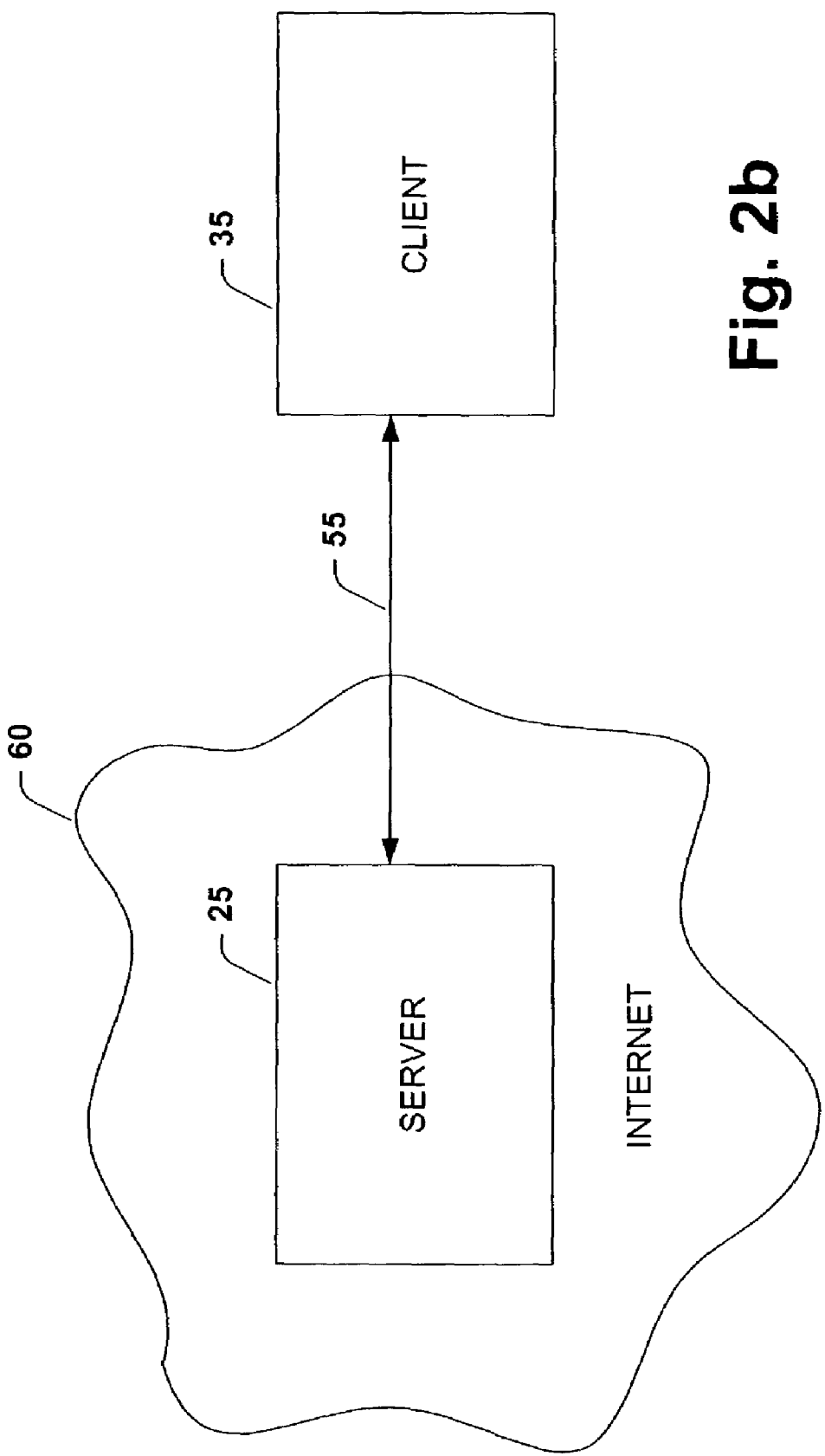
FIG. 2b is a schematic illustration of a client computer operatively coupled to a server computer system in accordance with one aspect of the present invention.

As previously stated, the present invention could take advantage of the wide availability and versatility of the Internet. Referring to FIG. 2b, a schematic block diagram is illustrated which depicts an environment of interest in accordance with an aspect of the present invention. The client computer system 35 is shown connected to the central server computer system 25 that is part of the Internet 60. The client computer system 35 and server 25 are connected via an Internet connection 55 using a public switched phone network, for example, such as those provided by a local or regional telephone operating company. The Internet connection 55 may also be provided by dedicated data lines, Personal Communication Systems (PCS), microwave, or satellite networks, for example, or any suitable means. It is to be understood that the terms client and server are to be construed in the broadest sense, and that all such constructions of the terms are intended to fall within the scope of the hereto appended claims.

Figure 3:
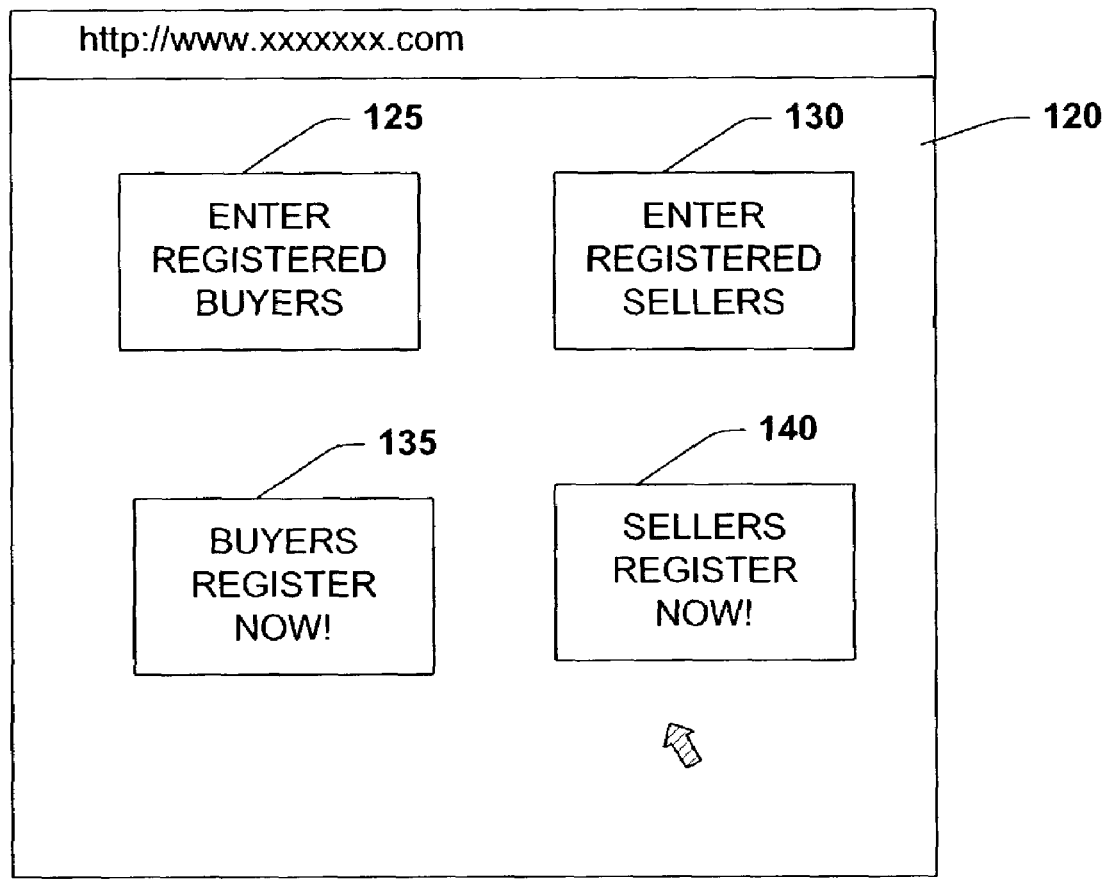
FIG. 3 illustrates a web page providing options to buyers and sellers desiring to conduct business electronically in accordance with one aspect of the present invention.

Turning now to FIG. 3, an exemplary Internet web page 120 which provides buyers 15 and sellers 20 with access to a forum for conducting business using the multiple criteria buying methodology described in detail below is shown. The web page 120 is shown to include hyperlinks for handling both registered and un-registered buyers and sellers of products. For example, as shown in FIG. 3, registered buyers may select a hyperlink to a registered buyer login screen via hyperlink 125 while non-registered buyers may select a hyperlink to a non-registered buyer registration screen via hyperlink 135. Similarly, registered sellers may select a hyperlink to a registered seller login screen via hyperlink 130, while non-registered sellers may select a hyperlink to a non-registered seller registration screen via hyperlink 140. While the present aspect illustrates separate hyperlinks for buyers and sellers, it will be appreciated that such hyperlinks could alternatively be combined and the status of buyer or seller could be determined during a later stage in the login procedure.

Figure 4A:
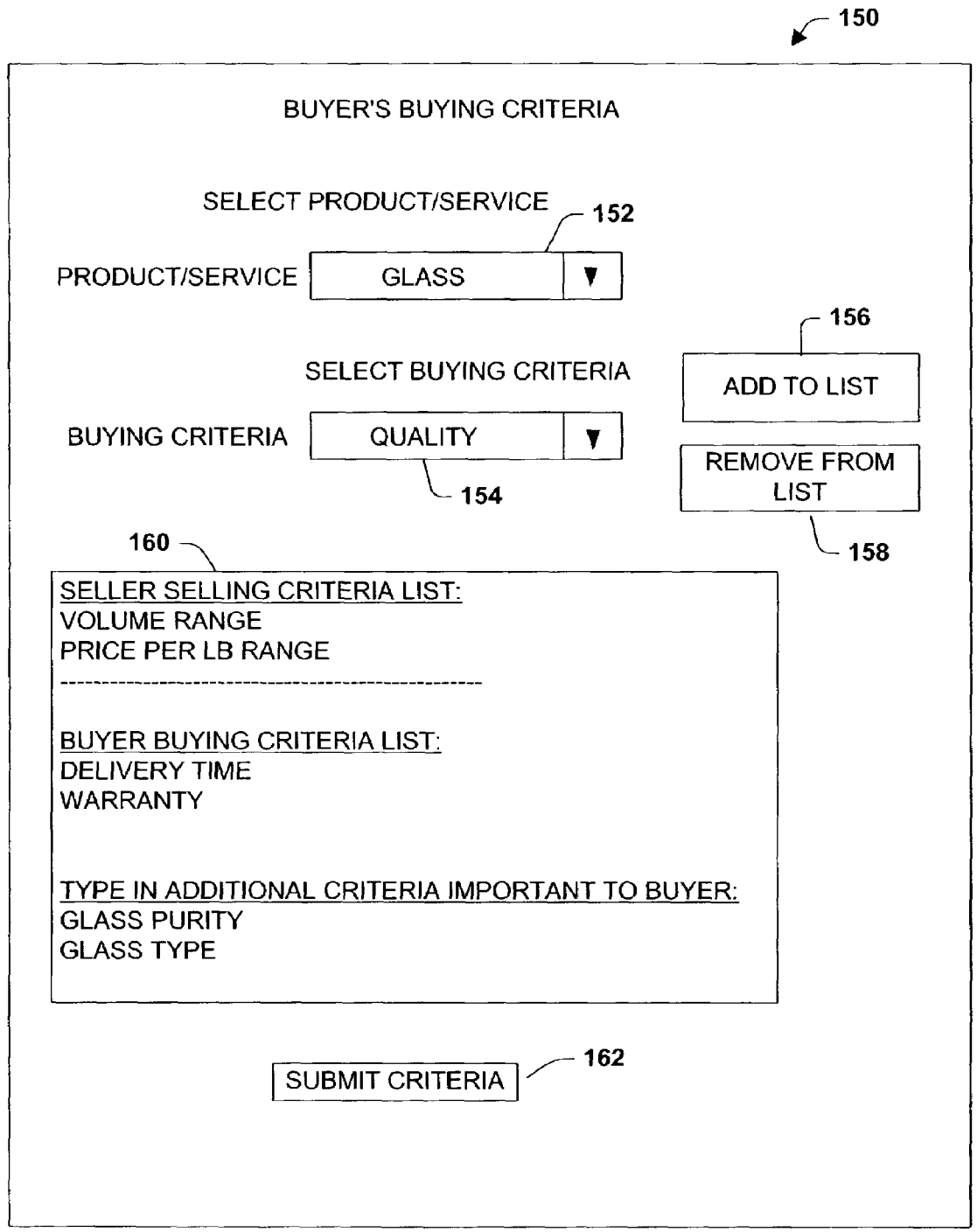
FIG. 4a illustrates a buyer's buying criteria input screen in accordance with one aspect of the present invention.

Turning now to FIG. 4a, in accordance with an aspect of the present invention, registered buyers 15 enter several product buying criteria into a "Buyer's Buying Criteria" input page 150. The buyer 15 selects a product or service from a list in a scroll down menu 152. It should be appreciated that the list on the scroll down menu 152 could include any number of related or non-related goods and services only limited by the size of a database used in accordance with the present invention. Upon selecting a product or service (e.g., glass) from the scroll down menu 152, a list of seller criteria automatically appears in a window 160. The list of seller criteria appearing in the window 160 can include minimum inputs to be provided by the buyer to obtain a deal listing. These minimum inputs are decided by a class of sellers selling individual product(s) or service(s) and/or decided by a system administrator of the system. The buyer 15 can then begin adding buying criteria by selecting criteria from a scroll down list 154, and clicking on an "Add to List" button 156 with a computer mouse (not shown) or via a touch screen, for example. If the buyer 15 desires to remove a selected criterion, the buyer can highlight the criterion in the window 160 and click on a "Remove from List" button 158. Once the list is completed, the buyer 15 may add additional criteria not in the selection of choices. The additional criteria may or may not be utilized in this particular deal search; however, if it is not, it will be provided to the sellers, such that they can be alerted of these additional criteria important to the buyer. Accordingly, sellers may opt to add the additional criteria to the selectable choices at a later time. Once the complete custom buying criteria list is completed, the buyer can click on a "Submit Criteria" button 162 for submission of the buyer's buying criteria to build a "Buyer's Product Ordering Criteria" input screen 165, as illustrated in FIG. 4b.

Turning now to FIG. 4b, in accordance with an aspect of the present invention, buyer 15 enters several product ordering criteria that would be acceptable to the buyer 15 on a "Buyer's Product Ordering Criteria" input screen 165. In this particular example, the buyer 15 is looking to purchase raw glass by the pound, however, many different types of products and services could be purchased/sold using the present invention. The buyer's ordering criteria of this example includes: price range 166 in dollars per pound; volume range 168 in number of pounds; delivery range 170 in days; the acceptable % of defects 172 in percent; and the minimum required warranty 174 in months. The buyer 15 can then list the names of the sellers 20 in the window 176 that the buyer 15 has bought products from previously, so that the buyer 15 can be entitled to any good customer or multi-purchase discounts offered by the sellers 20. Once the buying ordering criteria are entered, the buyer can search for deals by clicking on a "Search for Deal" button 178 on a touch screen and/or via a mouse. A search engine can then be employed to search through a database of deals offered by various sellers of the product, and provide an output of deals to the buyer which matches the buyer's ordering criteria. The output can be displayed on a "Deal Matching Ordering Criteria" page 180, as shown in FIG. 4c.

Figure 4C:
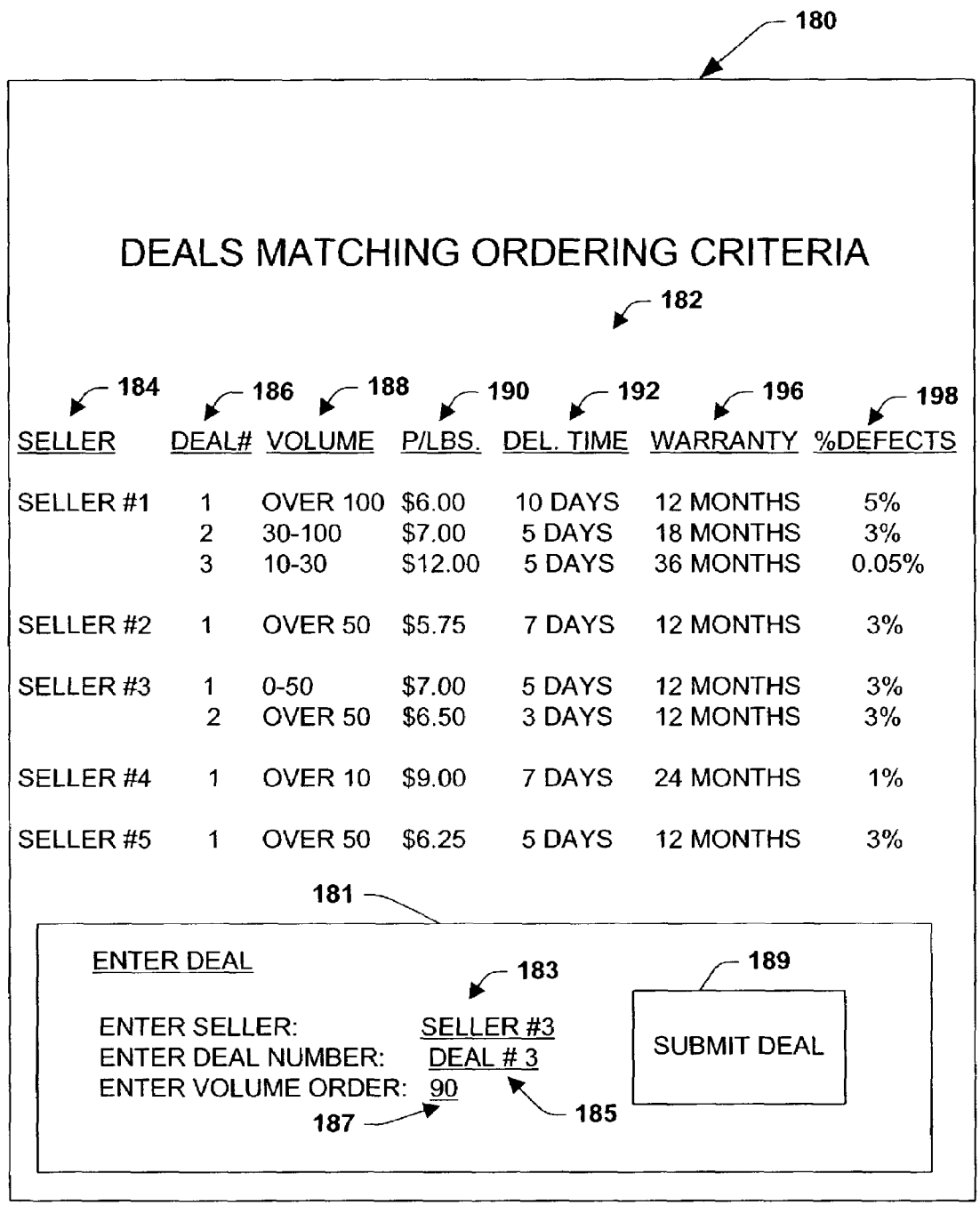
FIG. 4c illustrates a list of seller's deals matching the buyer's product ordering criteria in accordance with one aspect of the present invention.

In FIG. 4c, registered sellers 20 set up a variety of deals 182 by which buyers 15 are able to order products. As will be discussed in more detail below, the variety of deals 182 are set up to display the following information which is input from the seller 20 and/or calculated by the processor 100 of the central processor 25 according to the deal 182, which includes: a seller name 184; a deal number 186; a volume ordering range required 188 to obtain a current price/pound level 190; an expected delivery time 192; a warranty period 196; and a percentage of defects 198 of the product the buyer 15 can expect to receive in a given order. Based on such information, buyers 15 can make an informed decision as to whether they desire to order a particular deal based on the criteria that is important to that particular buyer 15. If a buyer 15 desires to place an order, the buyer 15 inputs a seller 183, a deal number 185 and a volume order 187. The buyer 15 then clicks on the "Submit Deal" button 189 with a mouse pointer, for example, on the computer display and the deal is finalized.

Figure 5:
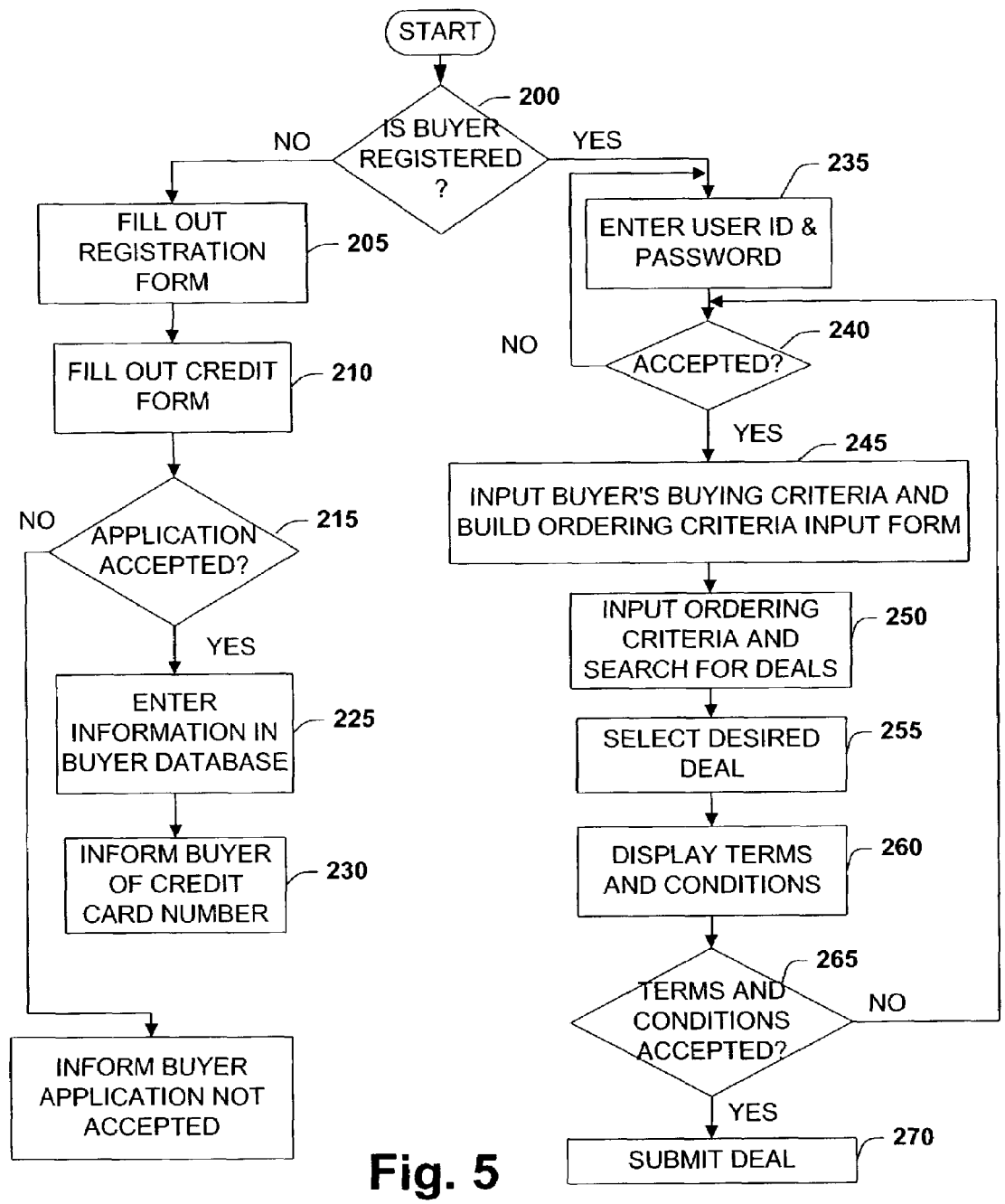
FIG. 5 illustrates a flow chart for a buyer desiring to conduct business electronically in accordance with one aspect of the present invention.

Turning now to FIG. 5, a methodology of entering web page 150 is illustrated. At 200, it is determined whether a buyer 15 is registered or not. If the buyer 15 is not registered, the buyer 15 selects hyperlink 135 (FIG. 3) and proceeds to 205. At 205, the processor 100 of the central server 25 requests that the buyer 15 fill out a registration form. For example, the buyer 15 is requested to fill out a registration form 208 such as that shown in FIG. 6. In the present example, the registration form 208 requests that the buyer 15 enter information such as: buyer name; address; primary contact person; phone; fax; e-mail; short description of company; preferred login user name; and preferred password. With respect to the user name and password, the processor 100 is configured to determine whether the selected user name and password combination are available and, if not, to prompt the buyer 15 to enter a new user name and password until an available combination is selected.

Turning back to FIG. 5, at 210, the buyer is requested to fill out a credit card application so that purchases made on the web site may be immediately approved. The credit card registration and approval process may be accomplished via a hyperlink to one of various electronic credit card approval agencies which check the buyer's credit rating and set up a merchant account with a line of credit. For example, an electronic credit card approval agency which may be used in conjunction with the present invention can be found on the Internet at internet-ecommerce dot com. Next, at 215, the processor 100 determines if the credit card application has been approved by the electronic credit card approval agency. If the credit card application has not been approved, the processor 100 proceeds to 220 where a message is sent back to the buyer 15 indicating regret that they have not been approved for a line of credit and therefore have not successfully completed the registration process. At 220, a customer service telephone number can be provided to the buyer 15 in case the buyer has questions and/or desires to pursue registration further.

If at 215, the processor 100 is informed that the buyer 15 has been provided a line of credit and a credit card number has been issued, the processor 100 proceeds to 225. At 225, the buyer information from the registration form 208 and the newly issued credit card number are stored in a buyer database 270 (FIG. 7) in the memory 105 of the processor 25 (FIG. 2a). Next, at 230, the processor 100 is configured to provide the buyer 15 with the newly issued credit card number so that the buyer 15 is able to purchase products and/or services. Furthermore, the processor 100 is configured to provide a report to the system administrator who then mails a confirmation copy of the buyer's information stored in the buyer's database to the buyer 15. This completes the buyer's registration process.

Returning back to 200, if a buyer has already registered, the buyer 15 may login as a registered user by selecting the registered user hyperlink 125 (FIG. 3). Once selected, the processor 100, at 240, prompts the buyer 15 to enter a user ID and password. Upon entry of such information, the processor 100 verifies the user ID and password with those stored in the buyer database 270 (FIG. 7). If the user ID and password entered by the buyer 15 does not match any entry in the buyer database 270, the processor 100 returns to 235 for re-entry of such information. If, however, at 240, a valid user ID and password are entered, the processor 100 proceeds to 245.

At 245, the processor 100 provides the buyer 15 with a buyer's buying criteria input screen where the buyer 15 is able to enter a variety of buying criteria that is important to that particular buyer 15. The buyer 15 selects a plurality of buying criteria and submits the criteria, so that the system can build an input ordering criteria form. At 250, the buyer 15 enters a range of ordering criteria that is acceptable to the buyer in the input ordering criteria form, and then submits the criteria causing the system search engine to match the ordering criteria with a list of seller deals in a seller deal database. The search engine then lists the seller deals matching the buyer's buying and ordering criteria. As discussed above, the deals 182 provide the buyer 15 with information regarding the sale of a particular product such as, for example, a volume range to get a particular price per pound, delivery time, warranty period and a percentage of defects in each order that a buyer can expect. In order to allow a buyer to quickly find deals 182 of interest, the processor 100 provides the buyer 15 with the input "Buyer's Buying Criteria" input screen 150, so that active deals 182 of interest may be found.

Once a search is completed, the buyer 15, at 250, can select a desired deal 182 from the results obtained. For example, the buyer 15 may choose a desired deal because it has a faster delivery time than the other deals. The buyer 15 may choose a deal because it has a low percentage of defects in the goods, or has a longer warranty than other goods. Regardless of the deal the buyer 15 may choose, the buyer 15 can make an informed decision based on a variety of buying criteria. If the buyer 15 is unsatisfied with the search results or simply desires to re-perform the search, the buyer 15 at any time is able to return back to a previous screen selecting the "back" function available using an Internet browser such as, for example, Microsoft Internet Explorer, Netscape, etc. Additionally, a hyperlink to various screens, such as the search screen, preferably is provided on each web page.

Upon selecting a deal 182, the processor 100 in step 255 displays a page of standard terms and conditions which the buyer 15 must agree to prior to completing the deal. The terms and conditions relate to the terms governing the sale of the product or service according to which both the buyer and seller are willing to conduct business. If the terms and conditions are not accepted, the processor 100 returns the buyer 15 to step 245, so that another deal 182 may be selected and/or another search may be performed. If, however, in step 260 the terms and conditions are accepted, the processor 100 proceeds to allow the buyer 15 to complete the deal in step 265.

Figure 8A:
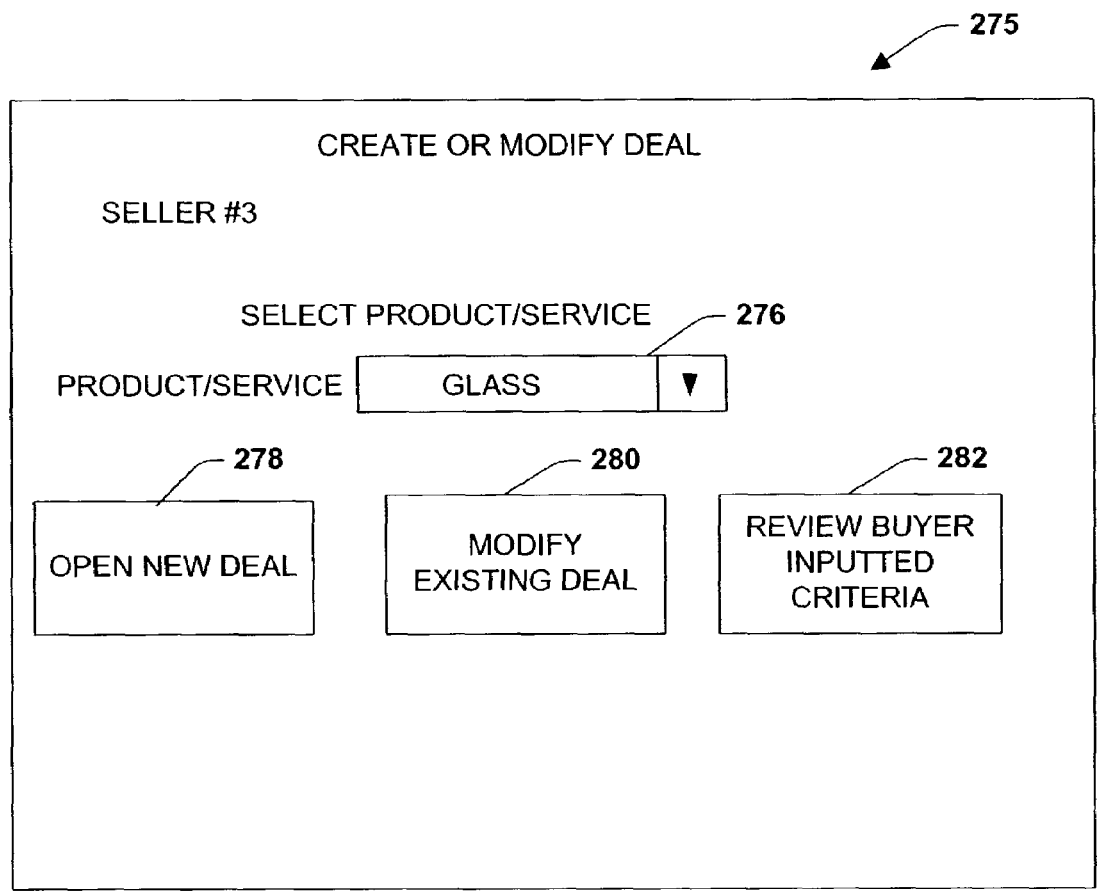
FIG. 8a illustrates a web page for a buyer to create or modify a deal in accordance with one aspect of the present invention.
Figure 8B:
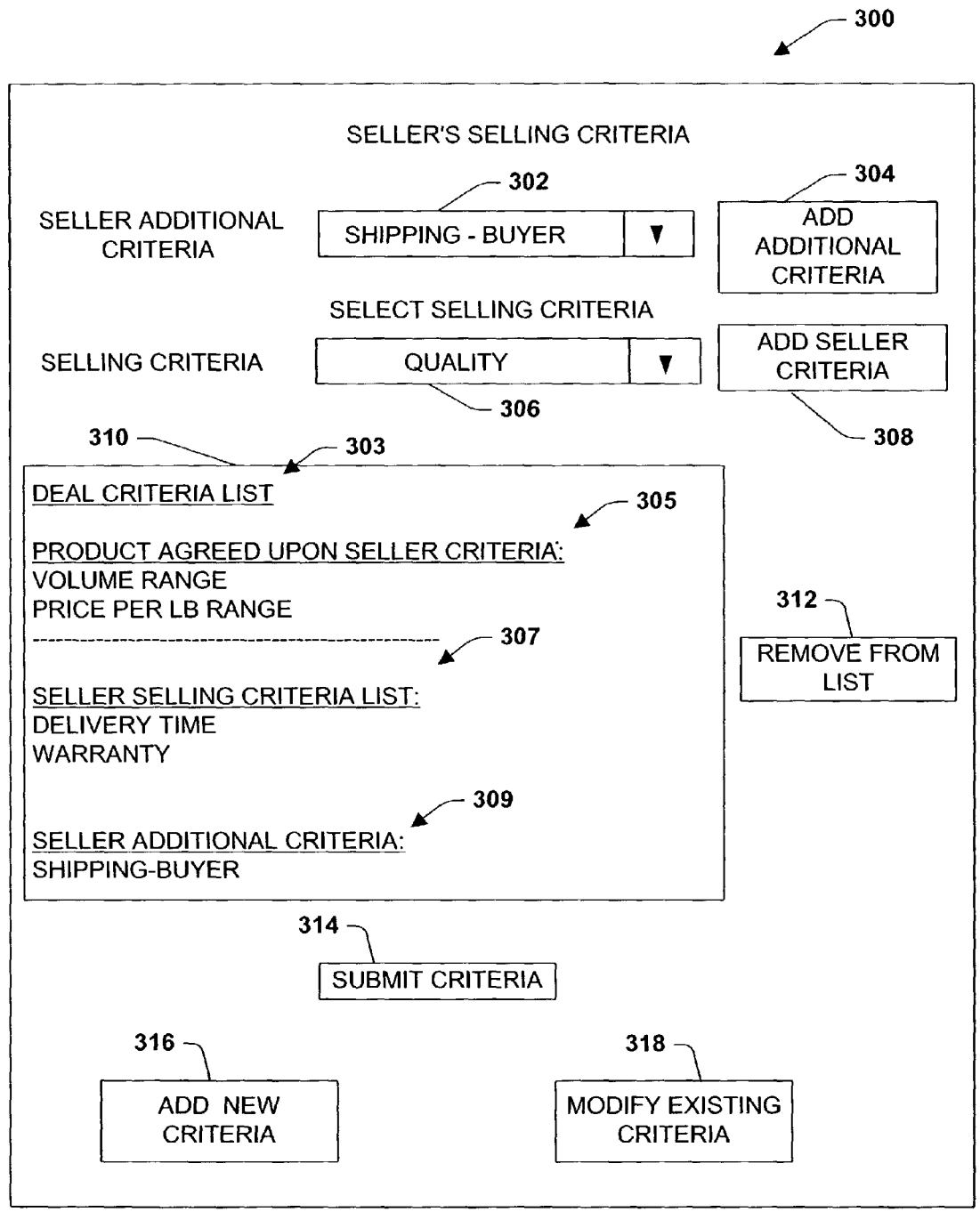
FIG. 8b illustrates a seller's buying and selling criteria input screen in accordance with one aspect of the present invention.

Turning now to FIG. 8a, in accordance with one aspect of the present invention, registered sellers 20 enter into a "Create or Modify Deal" screen 275. The seller 20 can choose a product or service from the product/service scroll down menu 276 and choose to either click on an "Open New Deal" button 278, a "Modify Existing Deal" button 280 or a "Review Buyer Inputted Criteria" button 282. If the buyer selects the "Review Buyer Inputted Criteria" button 282, the seller will be provided with a list of buyer buying criteria that the buyers 15 manually inputted into the window 160 of FIG. 4a. This allows the sellers 20 to review criteria that is important to their buyers, which the seller were not aware. If a seller 20 chooses to click on the "Open New Deal" button 278, the seller 20 will enter into a "Seller's Product Selling Criteria" input screen 300, as illustrated in FIG. 8b. If the seller 20 chooses to click on the "Modify Existing Deal" button 280, the seller 20 will enter into a "Seller's Product Offering Criteria" input screen 330, as illustrated in FIG. 8c with the seller being prompted to enter a deal number, which causes the ordering criteria of the chosen deal number to be editable in the input screen.

Referring to FIG. 8b illustrating the "Seller's Selling Criteria" input screen 300, the seller 20 can begin building a new deal by selecting a number of seller additional criteria, and seller criteria from a list in a scroll down menu 302 and a list in scroll down menu 306, respectively. The seller can click on the "Add Seller Additional Criteria" button 304 for adding seller additional criteria from the scroll down menu 302 into a window 310 containing a deal criteria list 303. The deal criteria list 303 includes a first portion listing the "Product Agreed upon Seller Criteria" 305, decided by the group of sellers for a particular product/service and/or the system administrator, a second portion which is the seller criteria list 307 and a third portion which is the seller additional criteria list 309. It should be noted that the criteria in the seller's additional criteria list is not a mandatory criteria for the buyer 15 when the buyer 15 is inputting the buyer's 15 buying criteria at 245 of FIG. 5, but is listed in the terms and conditions 265 after a deal is chosen by the buyer 15. The seller 20 can add seller criteria by selecting the criteria from the scroll down bar 306 and clicking on the "Add Seller Criteria" button 308. The seller 20 can remove any of the criteria from the overall criteria list, except for the "Product Agreed upon Seller Criteria", by highlighting the selection with the computer mouse and clicking on a "Remove from List" button 312. The seller 20 can add new selling criteria by clicking on a hyperlink 316 labeled "Add New Criteria" sending the seller 20 to an "Adding and Modifying Deal Criteria" screen 360, illustrated in FIG. 8d. The seller 20 can modify current criteria by highlighting the criteria in window 310 and clicking on a hyperlink 318 labeled "Modify Existing Criteria" sending the seller 20 to the "Adding and Modifying Deal Criteria" screen 360 with the criteria information defaulting to the highlighted criteria for modification therefrom.

Figure 8C:
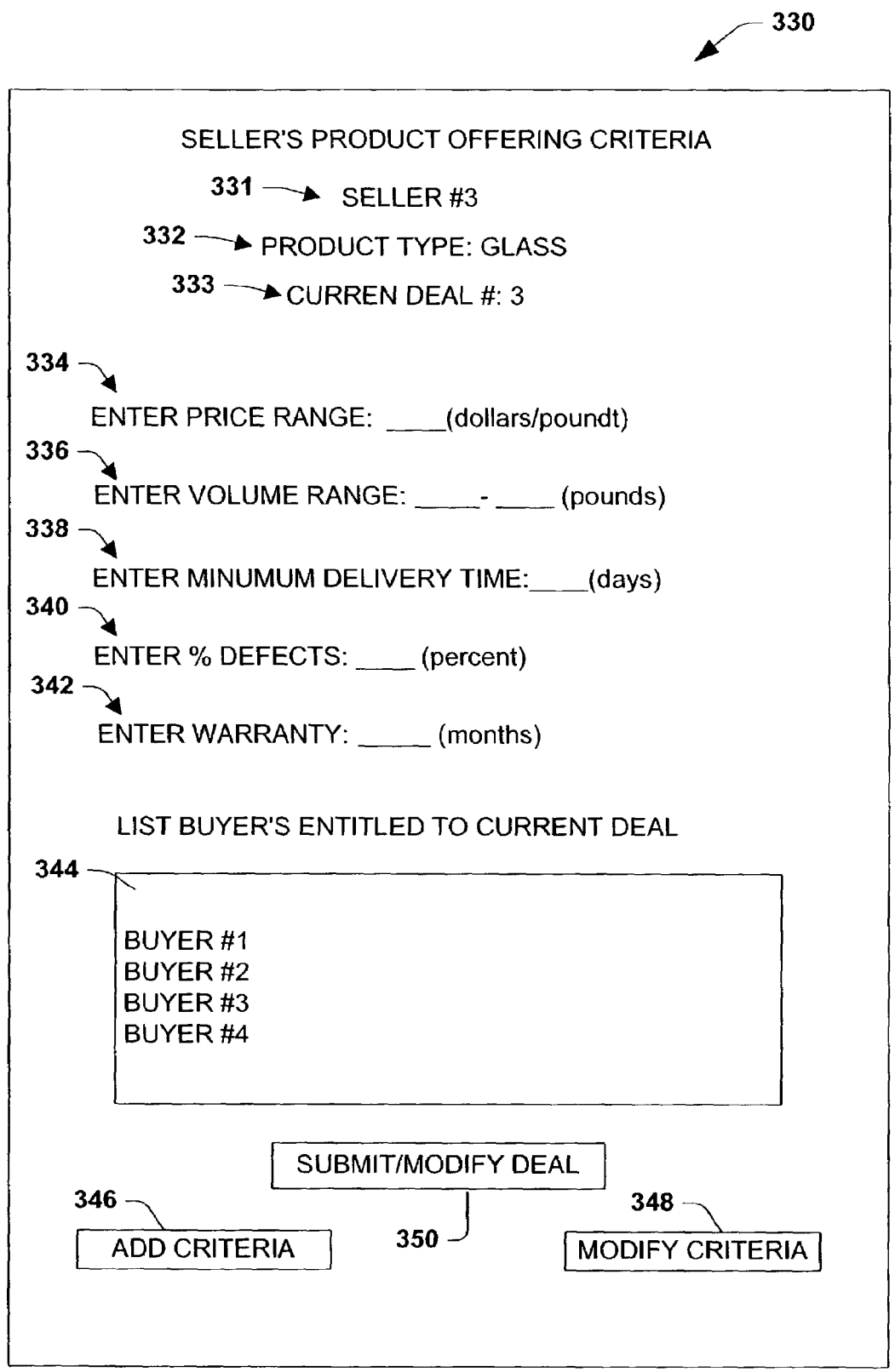
FIG. 8c illustrates a seller's product ordering criteria input screen in accordance with one aspect of the present invention.

Referring now to FIG. 8c, once the criteria are selected and submitted, the system generates the "Seller's Product Offering Criteria" input screen 330. A seller number 331, a product type 332 and a current deal number 333 are automatically generated and displayed on input screen 330. The seller 20 can enter offering limits relating to the selling criteria of the seller's product for a particular deal. The seller's offering criteria of this example includes: price 166 in dollars per pound; volume range 168 in the number of pounds; delivery time 170 in days; the % of defects 172 in percent; and the warranty 174 in months. The seller 20 can also list the names of the buyers 15 in a window 344 that the deal is being offered or select and/or type in a term, such as "All" if the offer is open to any buyer. Once the seller offering criteria is entered, the seller 20 can submit the deal by clicking on a "Submit/Modify Deal" button 350 on the computer screen by using the computer's mouse. The present invention then creates a record of the deal in a database of deals offered by various sellers 20 of the product. Accordingly, deals in which a seller's offering criteria match a buyer's ordering criteria can be output to the buyer 15 in a list of deals on the "Deals Matching Ordering Criteria" output page 180, as shown in FIG. 4c.

Figure 8D:
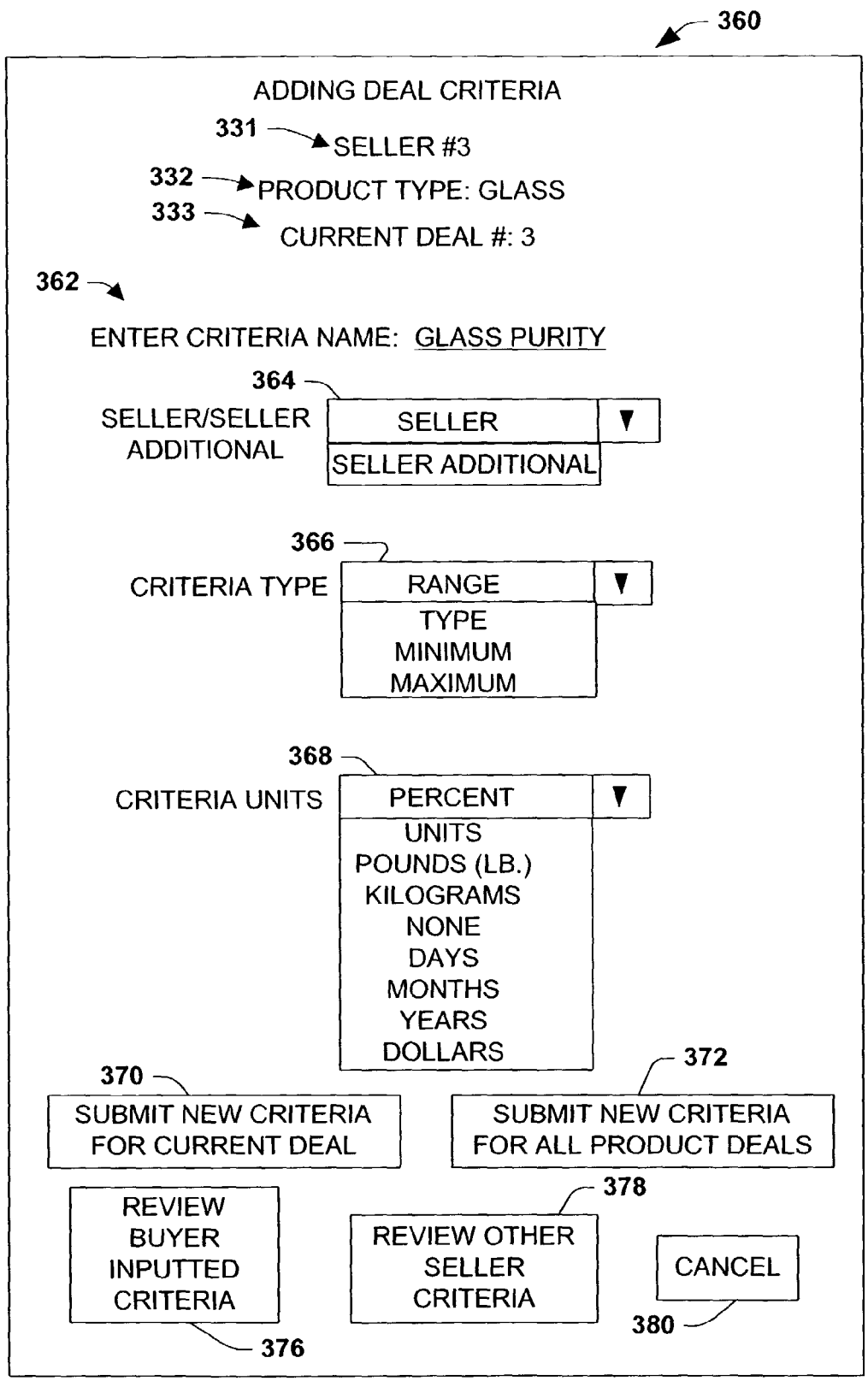
FIG. 8d illustrates an input screen for adding buying and selling criteria to the deal in accordance with one aspect of the present invention.

Referring now to FIG. 8d, an example of an "Adding Deal Criteria" input screen 360 is depicted. The seller number 331, the product type 332 and the current deal number 333 are automatically generated and display on an input screen 360. The seller 20 can enter a criteria name in the "Enter Criteria Name" box 362. The seller can then choose whether the criteria are a seller type or a seller additional criteria type from a first scroll down menu 364. The seller 20 chooses a criteria type from a second scroll down menu 366 and the criteria units in a third scroll down menu 368. The seller can submit these new criteria for the current deal by clicking on the "Submit New Criteria for Current Deal" button 370 or add the new criteria for the product deals by clicking on the "Submit New Criteria for All Product Deals" button 372. The seller 20 may at any time review the buyer inputted criteria submitted by the buyer 15 that is not in any of the seller's deals by clicking on the "Review Buyer Inputted Criteria" button 376. The seller 20 can review this list to determine whether or not the seller 20 would like to add these criteria to the present deal or deals such that they are in accord with buyer needs. The seller 20 may also review the criteria that are offered by other sellers, but not the current seller, by clicking on a "Review Other Seller Criteria" button 378. This will help the seller keep current on what the other seller's selling criteria are being utilized for matching to the buyer's buying criteria to satisfy the current market demands.

If the seller 20 would like to return to the "Create or Modify Deal" screen 275 the seller 20 can click on the "Cancel" button at any time. Furthermore, if the seller 20 simply desires to re-perform the search, the seller 20 at any time is able to return back to a previous screen selecting the "back" function available using an Internet browser such as, for example, Microsoft Internet Explorer, Netscape, etc. Additionally, a hyperlink to various screens, such as the search screen, preferably is provided on each web page.

Figure 9:
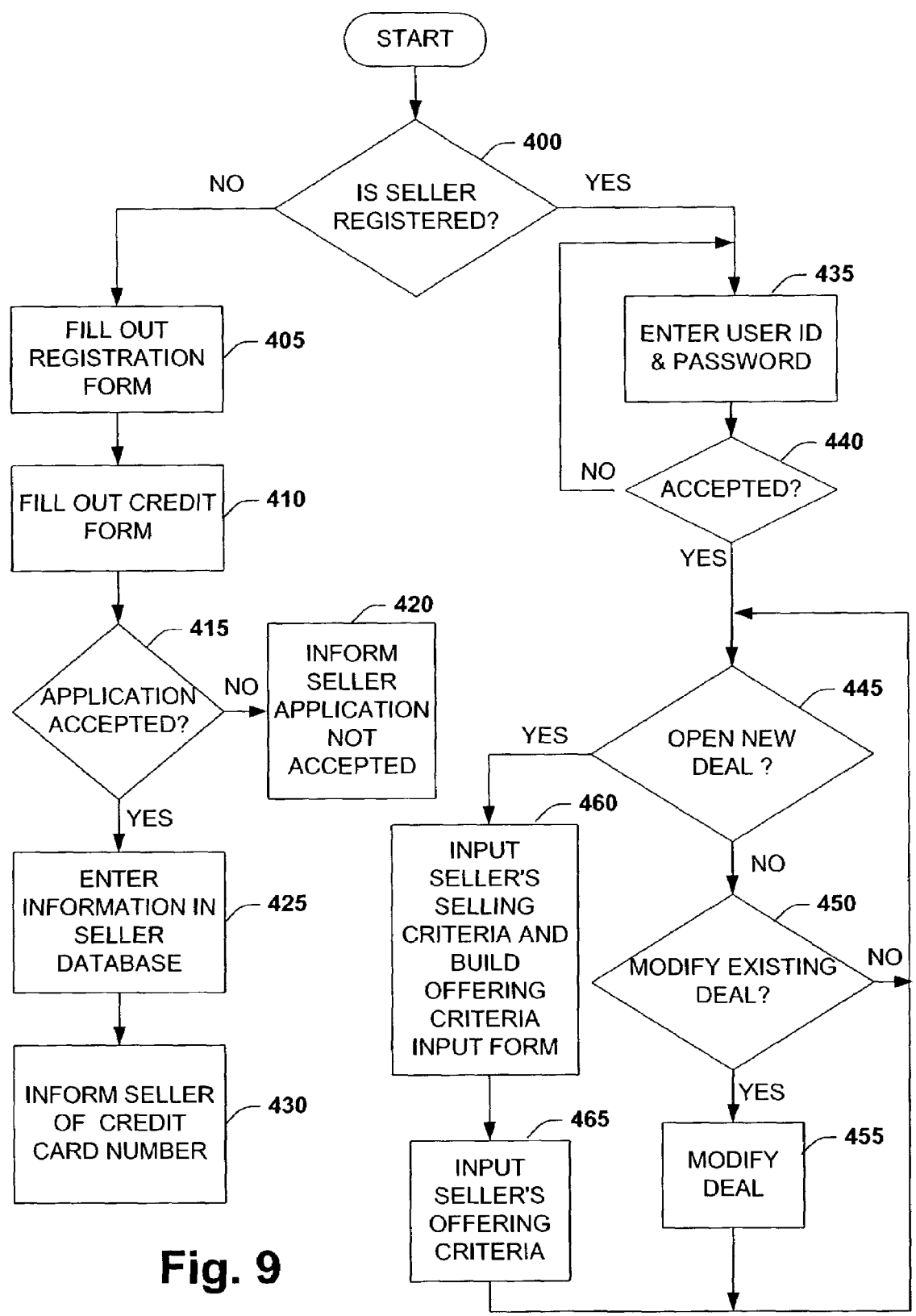
FIG. 9 illustrates a flow chart for a seller desiring to conduct business electronically in accordance with one aspect of the present invention.

Proceeding now to FIG. 9, the operations of the processor 100 of the central server 25 in handling sellers 20 is depicted. In particular, the processor 100 at 400 determines whether a seller 20 is registered or not based on which hyperlink 130, 140 (FIG. 3) the seller 20 selects. If the seller 20 selects hyperlink 140 indicating that the seller is not registered, the processor 100 proceeds to 405. At 405, the processor 100 provides the seller 20 with a seller's registration form 408 (FIG. 10) to fill out. The registration form 408 is similar to registration form 208 for the buyer 20 and allows the seller 20 to select a preferred user ID and password. Once completed, the processor 100 proceeds to 410 where the seller 20 is requested to submit a credit card application so that costs and fees associated with conducting business may be directly billed to the seller's credit card. As discussed above, the credit card approval process can be performed by a third party vendor accessible via a hyperlink.

Once the credit card application is submitted by the seller 20, the processor 100 proceeds to 415 where the processor 100 determines if the credit card application has been approved. If the credit card application has not been approved, the processor 100 proceeds to 420 where the seller 20 is informed that the credit card application has not been approved. The seller 20 can be provided with a customer service telephone number so that the seller 20 may optionally set up the account in a different fashion. If, however, at 415 the credit card application is accepted, the processor 100 proceeds to 425 where seller information is stored in a seller database 427 (FIG. 11). Then, at 430, the processor 100 is configured to provide the seller 20 with the newly issued credit card number so that the seller 20 is able to open deals. Further, the processor 100 is configured to provide a report to a system administrator, who can send a confirmation copy of the seller's information stored in the seller's database to the seller 20. This completes the seller's registration process.

However, if at 400 a seller has already registered, the seller 20 may login as a registered user by selecting the registered user hyperlink 130 (FIG. 3). Once selected, the processor 100, at 435 prompts the seller 20 to enter their user ID and password. Upon input of the user ID and password, the processor 100 proceeds to 440 where the processor 100 verifies a valid user ID and password have been entered by comparison with the information stored in the seller database 427 (FIG. 11). If the user ID and password entered by the seller 20 does not match any entry in the seller database 427, the processor 100 returns to 435 for re-entry of such information. If, however, at 440, a valid user ID and password are entered, the processor 100 proceeds to 445.

Upon successful entry of a user ID and password, the seller 20 is provided with a seller option screen 275 as shown in FIG. 8a. For example, the seller 20 may decide to open a new deal 182 or the seller 20 may decide to view a current deal 182 for one of a number of goods or services offered by the seller 20 or review a list of buyer inputted criteria. Accordingly, if at 445, the processor 100 determines that the seller 20 desires to open new deal 182 for a selected product, the processor 100 proceeds to 460.

At 460, the processor 100 requests that the seller 20 enter the seller's selling criteria, so that the system can build a seller's product offering criteria input screen, at 465. For example, in the present aspect the product agreed upon seller criteria is the volume range of the order and the price per pound of the order, the seller's selling criteria includes the delivery time and warranty with quality to be added next, and the seller additional criteria is that the buyer pay the cost of shipping the goods. As discussed above, the processor 100 utilizes the information input from the seller 20 to display a seller's product ordering input form 330.

At 465, the processor 100 request that the seller enter the limits associated with the seller's selling criteria chosen at 460, and the list of buyer's 15 entitled to be offered the present deal. The information is entered and submitted to form a deal. The processor 100 uses this information to match buying and ordering criteria of the buyer 15 with selling and offering criteria of the seller 20, so that deals can be completed in an expedited manner.

Continuing to refer to FIG. 9, if the seller 20 has not selected to open a new deal, the processor 100 determines, at 450, whether the seller 20 has decided to modify an existing deal 182. In the present aspect of the invention, the seller 20 is limited to modify those deals which they have opened. Accordingly, if the processor 100 determines that the seller 20 does desire to modify a deal 182, the processor 100 provides the seller 20 with a list of deals 180 which the seller 20 has opened. Upon selection of one of the deals 182, the processor 100 proceeds to 455 where the deal 182 is displayed to the seller 20. If a deal 182 is not entered at 450, or at 455 and/or 460, the processor 100 returns to 445.

Buyer(s) Sponsored DealRoom

Figure 13:
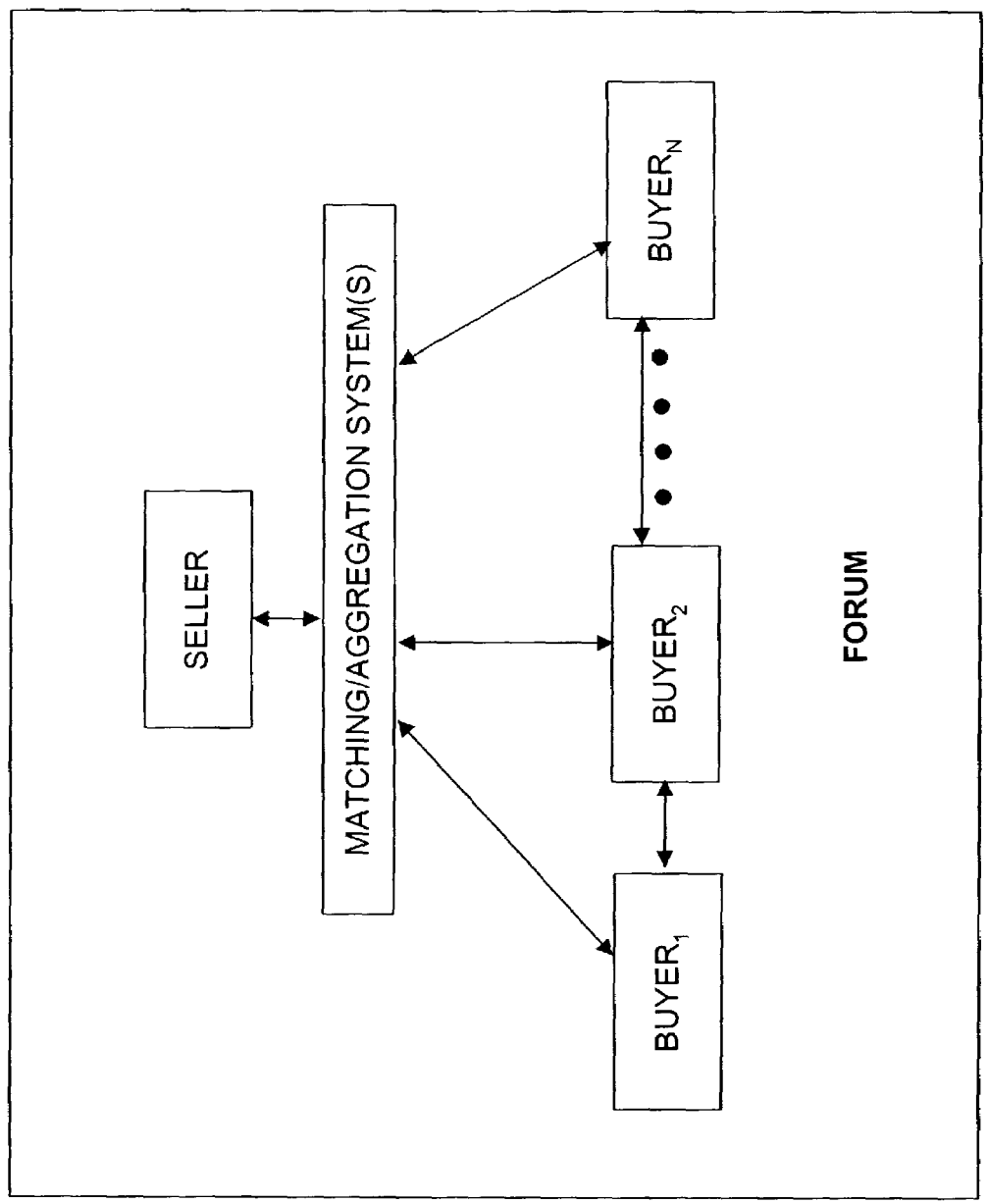
FIG. 13 is a schematic illustration of an electronic forum for conducting a seller sponsored business transaction.
Figure 14:
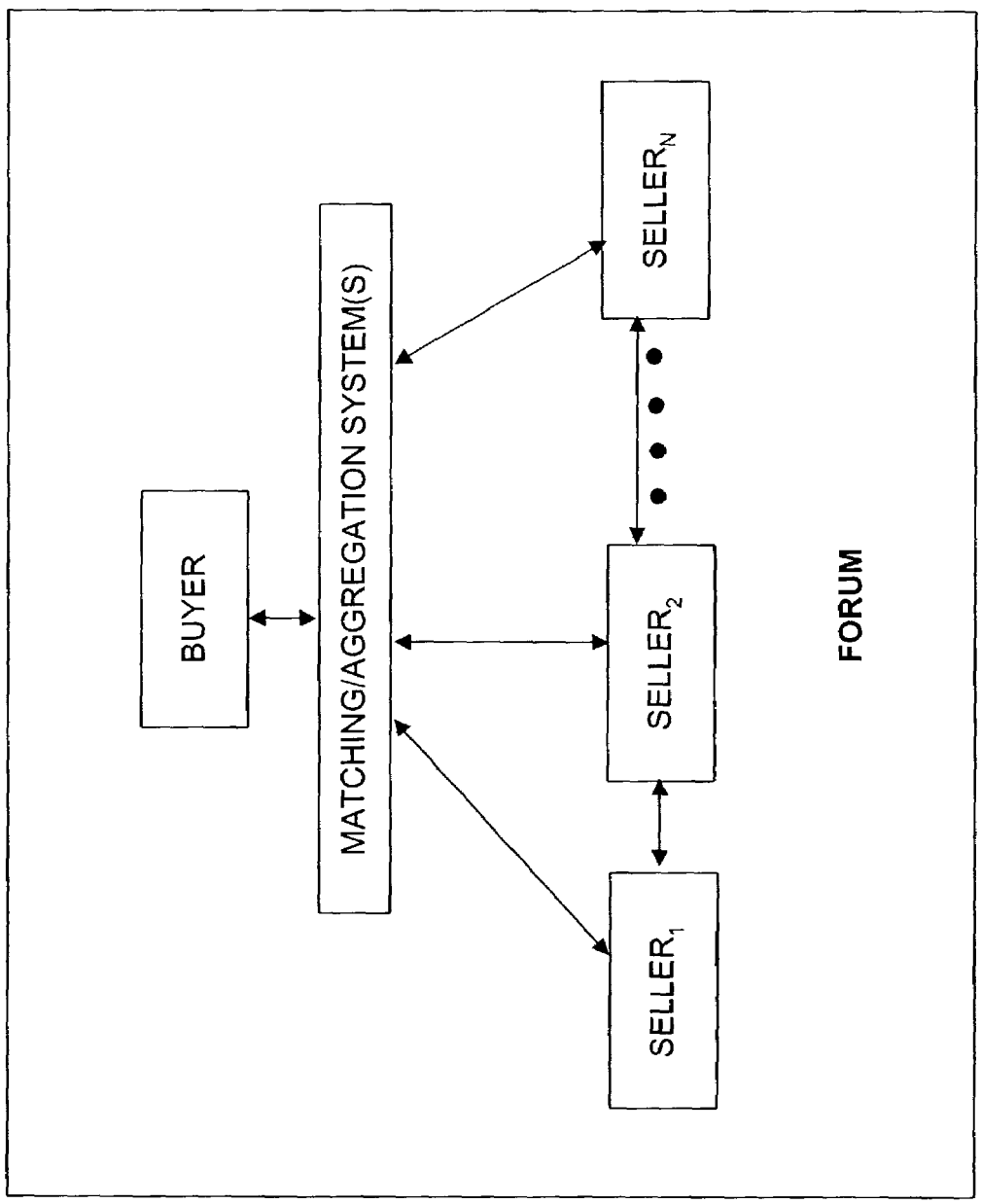
FIG. 14 is a schematic illustration of an electronic forum for conducting a buyer sponsored business transaction.

Regarding FIG. 14, although the present invention has been largely described within the context of a seller sponsored deal room (FIG. 13), it is to be appreciated that a buyer or buyers may sponsor a deal room to aggregate purchasing goods/services from a plurality of sellers. For example, a buyer can license a DealRoom and request that suppliers respond to an online offer. With a pre-approved name and password (from the registration page completed by the supplier), the supplier can see the offer with offer details and/or a specification. The supplier can choose to agree to accept terms of the specification; alternatively, the supplier can make a change to the offer and submit such changes for the buyer's review.

For example, a supplier may be asked to complete an online bid for a set volume of widgets. Supplier A sees a form that includes details of the offer (e.g. ship date or range, time period of offer, minimum volume quantity, total quantity available, volume reached on last offer, volume of last x number of offers, average for this product over the past x number of offers) and price points for the supplier to complete. As an illustration of this example:

A buyer requests a supplier to complete an online bid for the following:
Up to 100,000 widgets
100,001 to 300,000 widgets
301,000 to 500,000 widgets
500,001 to 1,000,000 widgets Supplier A completes price information as follows:
Up to 100,000 widgets: $5.50 per widget
100,001 to 300,000 widgets: $4.50 per widget
301,000 to 500,000 widgets: $4.00 per widget
500,001 to 1,000,000 widgets: $3.75 per widget The supplier then submits the price information to the requesting buyer. The supplier may be able to see other bids submitted by other companies. The bids can be shown in a variety of formats including: by supplier's name, by lowest price to highest price, by price curves (both individual and in comparison to one another), by the lowest priced supplier at each price point, etc. The curve can also be depicted in "the lowest price at each price point" and display the supplier as well for those prices, as illustrated below:

Up to 100,000 widgets: $5.00 per widget—Supplier B
100,001 to 300,000 widgets: $4.25 per widget—Supplier B
301,000 to 500,000 widgets: $4.00 per widget—Supplier A
500,001 to 1,000,000 widgets: $3.65 per widget—Supplier D A price curve can be displayed online for viewing information received from the suppliers in real time. The supplier can quickly modify the submitted prices by selecting a "modify price" option for a desired price tier(s). A bid can have an identification, or marking, which allows the competing suppliers to know what criteria are utilized in determining a winning bid (e.g., lowest price wins or price and delivery date considered). The bid marking assists suppliers in determining a pricing strategy when submitting prices.

Submitting bids can be performed in a variety of ways. For example, a period of time can be posted in which changes will be accepted. The price curve changes in real time; however, upon expiration of a predetermined time period, the price curve can become fixed. The supplier can view the suppliers that have "won" at the end of the time period and/or have presented a lowest price for a corresponding price point. As another example, a buyer can define a time in which the suppliers must have their final bids submitted. When the bids are received by the buyer, the bids automatically populate according to a lowest price at each price point. Price curves can then be posted to a website for participating suppliers to view the final bids received.

The system can include a resubmit feature. The resubmit feature allows a supplier to automatically replenish a current price curve with a previously submitted price curve. The system can also include a matching feature. The matching feature allows a supplier to match a winning price curve from a previous bidding session. For instance, a supplier can view a final price curve from a previous bidding session. The supplier can then elect to employ the final price curve as the supplier's new bid in a current bidding session.

A buyer, authorized to access an order (e.g., with a username and password), can view a current price curve and place an order for a volume of widgets listed. The buyer can view which supplier is associated with each price point. For example, the buyer can move a cursor over the price point and see the supplier with the lowest price at this point. Alternatively, the buyer can view a list of suppliers that have submitted price curves and can sort the list by the lowest price bids. Accordingly, the buyer does not have to select the supplier that submitted the lowest bid. Instead, the buyer can set parameters or rules within selection software based on a differential between a first supplier and a second supplier. For instance, if the first supplier is within 15% of lowest price, the first supplier should be given the "price slot" for that part of the curve and/or a supplier that won the last round for the price curve will be a default supplier if the next price given is not more than 5% more than the current supplier's price curve. The parameters/rules can be published for the supplier to review prior to accepting to bid.

The buyer can also determine a product ship date. For example, the offer can have the following selections:
   Single date: October $5^{th}$
   Multiple ship dates: October $5^{th}$, November $5^{th}$, December $5^{th}$
   Range of dates: October 1 thru October $8^{th}$ Additionally, the buyer can review the offer and, after placing an order, make a change to the ship date and enter new volumes for each ship date. Changes can be limited to a defined time period established by the buyer and agreed to by the supplier. Furthermore, as products are ordered and the ship dates are selected, the price curve dynamically changes to reflect a current state of the order. As more volume is ordered, the price continues to drop. As an example:
   Each buyer is able to place an order and select from the ship dates shown:
   20,000 widgets ordered
   Current price point:
   Ship dates:
      October $8^{th}$: 10,000 widgets
      November $8^{th}$: 5,000 widgets
      December $8^{th}$: 5000 widgets Flexibility can be built into a delivery schedule as well as based on requirements of the buyer. Additionally, buyers can later add to the order by selecting an icon. Any additional product ordered during this period falls under the last price point achieved. As an alternative, if the price point reached during an offer was supplier A, and the volume continues to increase after the order, the price can adjust in accordance with the original price curve.

The multiple supplier demand aggregation system can also include a "running" demand aggregation scenario. This scenario includes a predetermined time for an open order period (e.g., six months). If there is a supplier with a lowest price tier, then the supplier agrees to a predetermined number of ship dates and is considered the current supplier for the order. As more products are ordered during the predetermined time period, the price can continue to decrease. At the end of the time period, a final price is determined, an average price paid is shown, and if the average price paid is higher than the final price shown on the curve, system software calculates an amount the supplier owes the buyer. For example, if 500,000 pieces are ordered with a price shown of $3.50 per piece and the average price paid during the period was $4.00 per piece, then the software calculates the amount per piece and the total number of pieces purchased and submits a rebate amount to the supplier and/or the buyer.

Additionally, the rebate can be determined during the order based on a current price curve. For instance, if the first price was $5.00 per piece and the volume ordered decreases the price to a next tier or to $4.50, then the buyer would submit a request for a rebate for the amount paid at $5.00 and once received, begin paying the lower price moving forward.

The system can also include a real time rebate curve. For example, buyers purchase enough volume to reach a second price tier. If the first price tier is $5.00 per piece and the second price tier is $4.50 per piece after 50,000 were ordered, the buyer would be entitled to a difference of 50,000×0.50 or $25,000. Software can calculate the rebate amount and either inform the supplier of the deficit of the rebate, or the software could calculate the next price tier to achieve.

A variety of options exist as well to parcel out the rebate including:
   No product fees charged until the rebate amount, or amount owed, is recovered.
   The original companies that ordered would receive their commensurate rebate amount based on a percentage of products ordered out of the total products ordered. This figure would also be saved on their online records. They could have a credit for future purchases or be refunded the rebate to their online accounts.
   A reduced fee with a predetermined price floor (e.g., $2.00 per piece) is established and agreed to by the buyer and/or supplier until the rebate amount is recouped from the volume.
   A period of time could be established to account for the difference. The buyers and supplier would be notified and a second price ($4.50 in the example above) would be established at that new price point.

This process of options may continue throughout the downward slope of the price curve as more volume is ordered.

Multiple Buyer and Multiple Seller Sponsored DealRoom

Figure 15:
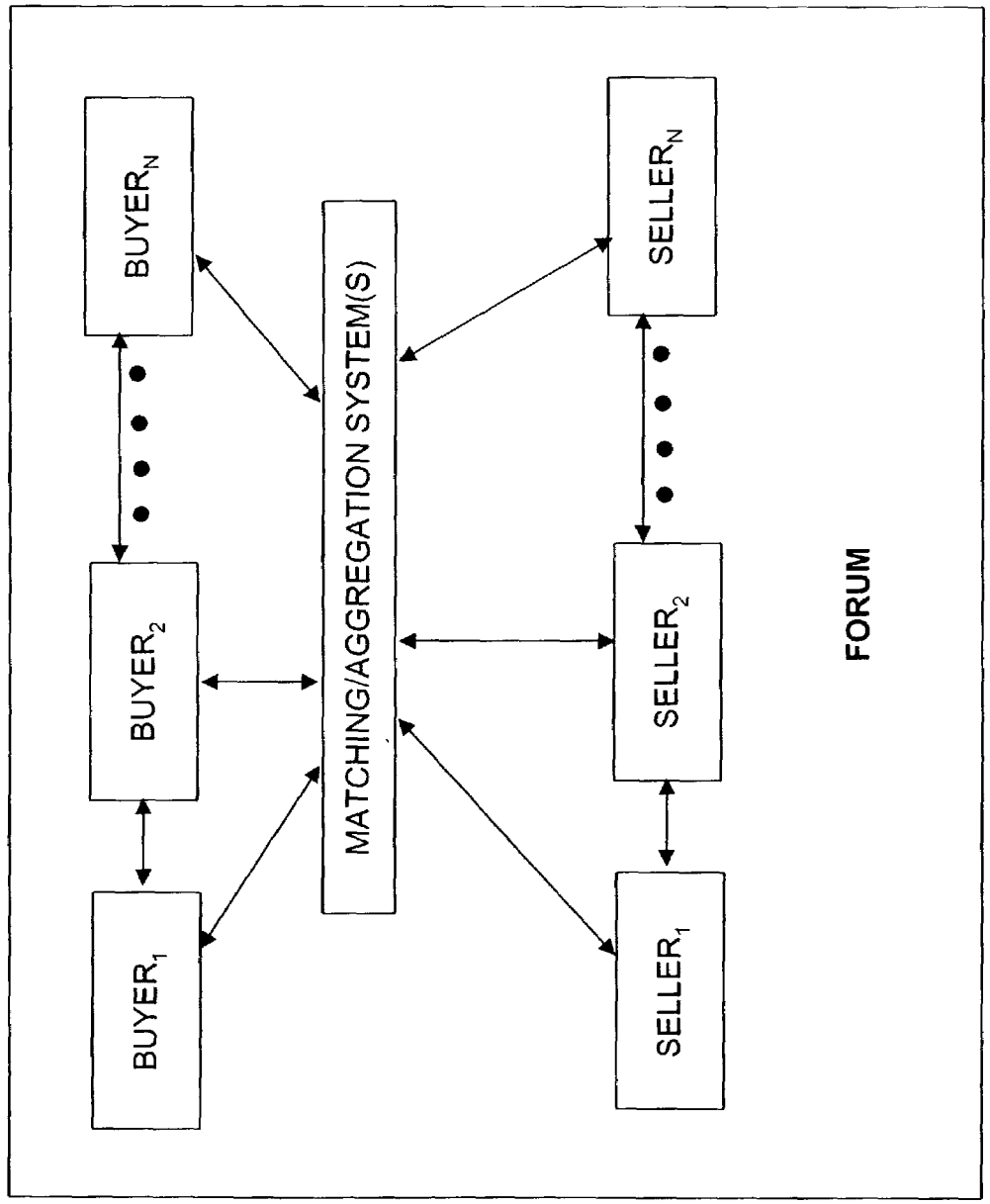
FIG. 15 is a schematic illustration of an electronic forum for conducting a buyer and seller co-sponsored business transaction.

Regarding FIG. 15, although the present invention has been largely described within the context of a seller sponsored deal room/transaction, it is to be appreciated that buyers and sellers may concurrently sponsor a deal room/transaction to aggregate selling of and purchasing of goods/services by a plurality of sellers and buyers respectively. For example, multiple sellers and buyers may employ the present invention to create a deal room/transaction forum where a plurality of sellers and buyers may assemble to aggregate selling and buying of specific goods and/or services that the sellers which to sell and the buyers desire to purchase. Such a transaction forum creates great efficiencies with respect to purchase price and/or selling quantity of particular goods/services. For example, in a forum dedicated to the selling and purchasing of a specific product/service, sellers can aggregate to compete for a sale of their respective product/service which leads to pricing efficiencies. Buyers can assemble in the forum to aggregate buying power for negotiating good prices and close deals. Sellers can also aggregate to meet needs of a large buying block. The subject specification describes exemplary systems and interfaces for implementing the subject invention, and therefore further discussion thereto is omitted for sake of brevity. However, it is to be appreciated that one skilled in the art based on the above discussion regarding seller sponsored DealRooms/transactions could apply such teachings to implement the aforementioned buyer sponsored DealRoom/transaction and the multiple buyer and multiple supplier sponsored DealRoom/transaction.

OpenOffer Management System using Demand Aggregation

An aspect of the present invention facilitates creating, altering and/or managing OpenOffer sheets on more than one DealRoom substantially simultaneously when posting offers (e.g. price curves) to a plurality of buyers. This aspect of the invention (preferably implemented via software) allows a company and/or seller completing an OpenOffer Sheet to select DealRooms it wishes to submit the OpenOffer sheet. For example, a first OpenOffer sheet with one price and volume schedule may be automatically submitted to DealRoom #1 and #2; while a second OpenOffer sheet can be submitted for the same product with different price points and volume schedules to DealRoom #3. The system allows a supplier to track any number of DealRooms and label a customer accordingly. The supplier may create subsets of private DealRooms at any time through grouping the DealRooms and saving them with a different name (e.g., mid-size companies, tier one, large company). This enables the supplier the real-time ability to segment customers according to any number of criteria and present current pricing and capacity information. Therefore, the system is a tool for creating any number of pricing configurations among different products and updating those prices and volumes in a moment's notice among the selected DealRooms.

A company is able to see a pricing summary by product type across DealRooms. For example, the ability to select a product category and have the system return a list of the prices submitted for each along with the current price and the lowest price to be achieved. This allows for the company to track pricing strategy across DealRooms. The information can be reviewed in any number of configurations: pie chart, bar chart, scatter chart, etc. and any subsets of DealRooms. Statistical numbers are also available including totals, averages, etc.

The system also provides a running list of buyers that have access to DealRooms supported by the company. This is done through a search file in that private DealRoom and saved to the master management system. Every DealRoom can have a different URL such as WCeWinWin dot com or ADeWinWin dot com or eWinWin dot com slash companyA with the requisite security. The system is also capable of performing a search by entering the customer name which then provides the proper DealRoom and password. Changes may be made by the supplier.

The OpenOffer Sheet can be posted on a regular interval and/or programmed to reset the offer with a rolling date (e.g., daily, weekly, biweekly, monthly) on master and individual sites. In addition, a component(s) of the OpenOffer Sheet can be altered and saved under a different name. For example, if a price is selected to stay constant while a ship date changes to the next business day on a regular interval, that OpenOffer sheet can be saved and posted. The iteration will automatically change during the predetermined intervals. Likewise, the function of freezing OpenOffer sheets with or without intervals is possible.

OpenOffer sheets can also be retracted. A recall feature can pull offers from a plurality of the DealRooms. The product name and identification number can be accessed and the recall feature engaged. In the event that orders are already placed within the OpenOffer sheets, the supplier can fulfill the order as scheduled or notify the buyers that the offer has been retracted.

The supplier can also list and search OpenOffers in which no orders have been placed. This is done with a quick search that will pull up the OpenOffers, DealRoom URL, projected ship date, etc. The master list can be perused and when highlighted, the supplier can modify the information and post again within the specified DealRooms. Such changes as price, volumes, ship dates, close dates, etc. can be made and the new DealRooms submitted.

The ability for a supplier to create another DealRoom online instantly is available. The option is resident on particular website. The supplier highlights a "Create New" DealRoom option and is presented a room identification number and a base URL. The supplier is asked to name the URL with up to a certain number of digits. Once a name and administrator's password is selected, the new DealRoom is available. Additional information including contact name, e-mail address of contact, customization of the front page, etc. is resident.

The ability for a company to create a private DealRoom online for invited buyers is provided. The invited buyers are notified of the opening of the DealRoom and given a username and password, so that the buyers can remain anonymous. Preferred customers can also be given pseudonyms, so that they can travel from DealRoom to DealRoom, while maintaining their anonymity from reports generated by other suppliers and buyers utilizing the OpenOffer Management system. E-mail notifications of deals can be automatically sent to predetermined customers.

A company can also create a private DealRoom online, without revealing their identity. The supplier can enter a pseudonym and basic company criteria, such as the type of company (e.g., fortune 500, midsize, small), quality ranking, type of business (e.g., specialized, conglomerate). The company can then track purchases and demand under the pseudonym. The DealRoom can be configured to be offered to a specified group, such as distributors or preferred customers, or the general public as a blind offer. The deal room can be configured as a single order deal or as a time specified deal that allows buyers to aggregate in and reduce the price.

Transaction fees can be requested and/or viewed in real-time across DealRooms. The fee structure is applied for a customer based on the number of single transactions (e.g., completion of OpenOffer sheet by customer) and this fee is calculated accordingly for an online transactional fee.

Demand Aggregator System

A demand aggregator system captures and collates current or historical orders from OpenOffer sheets. For example, an OpenOffer Request Form allows a buyer to alert suppliers of product needed, category, quantity and shipment. Accordingly, suppliers can respond with OpenOffer Sheets to match the Request. An alert can be sent via e-mail to a designated address given by the supplier. The buyer can request a public or private DealRoom. In the private DealRoom, the identity of the buyer remains anonymous. The buyer can provide a pseudonym or an e-mail address to allow the supplier to notify the buyer or post a message to the buyer.

An OpenOffer Request Summary is available by product category. For instance, the supplier can aggregate requests from DealRooms by product category. In this way, the supplier may see a level of demand required by its buyers in advance of placing an OpenOffer for the product. This feature can be accessed in real-time or at predetermined time intervals. An icon can be selected to display the summary of products being requested and pertinent data related to shipments. Excess capacity can be priced to preferred customers.

Current orders for a product can be compared and contrasted with an aggregated volume received from OpenOffer Requests for the same product and requested ship dates. The aggregation and comparison allows the supplier to better estimate production estimates and forecasts, which facilitates better planned production and business decisions. For example, the supplier can determine cost savings in terms of labor, material, production runs, etc. which, in turn, allows the supplier to estimate the savings and prepare suitable prices and volume points.

The system further includes a search engine which allows a user to search deals over different supplier sites including the particular product requested.

Other information included in the system:
  Total capacity posted by product, total, timeline, etc.
  Total number of orders placed by product, total, timeline, etc.
  % of capacity remaining by each product category measured over a timeline
  Average price per product by product category, DealRoom, customer, etc.
  Historical timeline of product ordered, average price, breakdown by DealRoom, etc.
  Historical review of total capacity listed by product that went unpurchased
  Historical review of total orders over days, weeks, months, quarters, etc.
  Chart of top customers for each product line
  Projected sales taking historic information by product and extrapolating over time by weeks, months, etc.
  Trend analysis of product mix over periods of time
  Evaluation of the volume of unpurchased product over the upcoming months and when such capacity will be taken off market (e.g., termination of specials from completed OpenOffer Sheets with close dates)

Private Buyer DealRoom Management System

A private buyer DealRoom management system allows a buyer to review product summaries and order information in any number of ways on the system based on private buyer DealRoom transactions. For instance, the buyer can review:
  Total orders placed by product, group, average, etc.
  Total share by product type for each supplier—measured over days, weeks, months, etc.
  Summary of supplier ranking by product category
  Summary of current pricing information by product category
  Historical review of total orders over days, weeks, months, quarters, etc.
  Projected orders for each product taking historic information and extrapolating over time by weeks, months, etc.
  Trend analysis of product mix over periods of time. The trend analysis can be available on a site for suppliers to review to facilitate completion of OpenOffer Sheets with relevant volumes
  Comparison of percentage of products delivered on-time by product category over days, weeks, months, etc.
  Comparison of percentage of products which meet predefined quality criteria
  Comparison of percentage of product suppliers with good customer service
  Price trends for a product over time: days, months, quarters, years.
  Supplier profiles over any period of time in price, quality, customer service, and deliver with a line chart showing trends to those suppliers via e-mail
  Supplier profiles of a similar product to compare performance over time
  Relative supplier performance versus other suppliers in a category
  Supplier performance. For example, buyers can set minimum performance rankings for suppliers. If a supplier fails to meet the minimum standards, the buyer can be notified of the failure. Further, the buyer can choose and option which will list suppliers in jeopardy of failing the performance standards along with a brief order summary and ranking totals The buyers can send email to suppliers via the management system. Buyers can further, review the number of orders placed online and the fees associated therewith.

Trend Analysis System

A trend analysis system captures and collates current and/or historical orders from OpenOffer and OpenOffer Request sheets. The system can aggregate patterns of buyers and/or suppliers. The buyers can be aggregated in areas such as purchases and demands; while the suppliers can be aggregated in areas such as offers and performance criteria. The information collected and collated can be employed to create a variety of trend analysis reports, which can be provided in any suitable format (e.g., pie charts, time lines). Such reports facilitate create buying blocks for buyers and assist suppliers adjust deal room offers. For example, the reports can be utilized to identify various problems with buyer OpenOffer Request trends and supplier OpenOffer trends. Any problems can be communicated back to the buyers and/or suppliers via the system. Reports can also be provided on anonymous buyers and sellers under his/her pseudonym. The system can communicate between websites to rank suppliers based on various criteria. The system can also establish transactional profiles based on industries, geographical location and time periods.

Market Share System Reports

Market share system reports provide files for suppliers to see relative market shares they have products versus the competitors' market shares. The suppliers can view the information online with similar functionality employed in the Private Buyer DealRoom Management System.

OpenOffer Merge File

Figure 12:
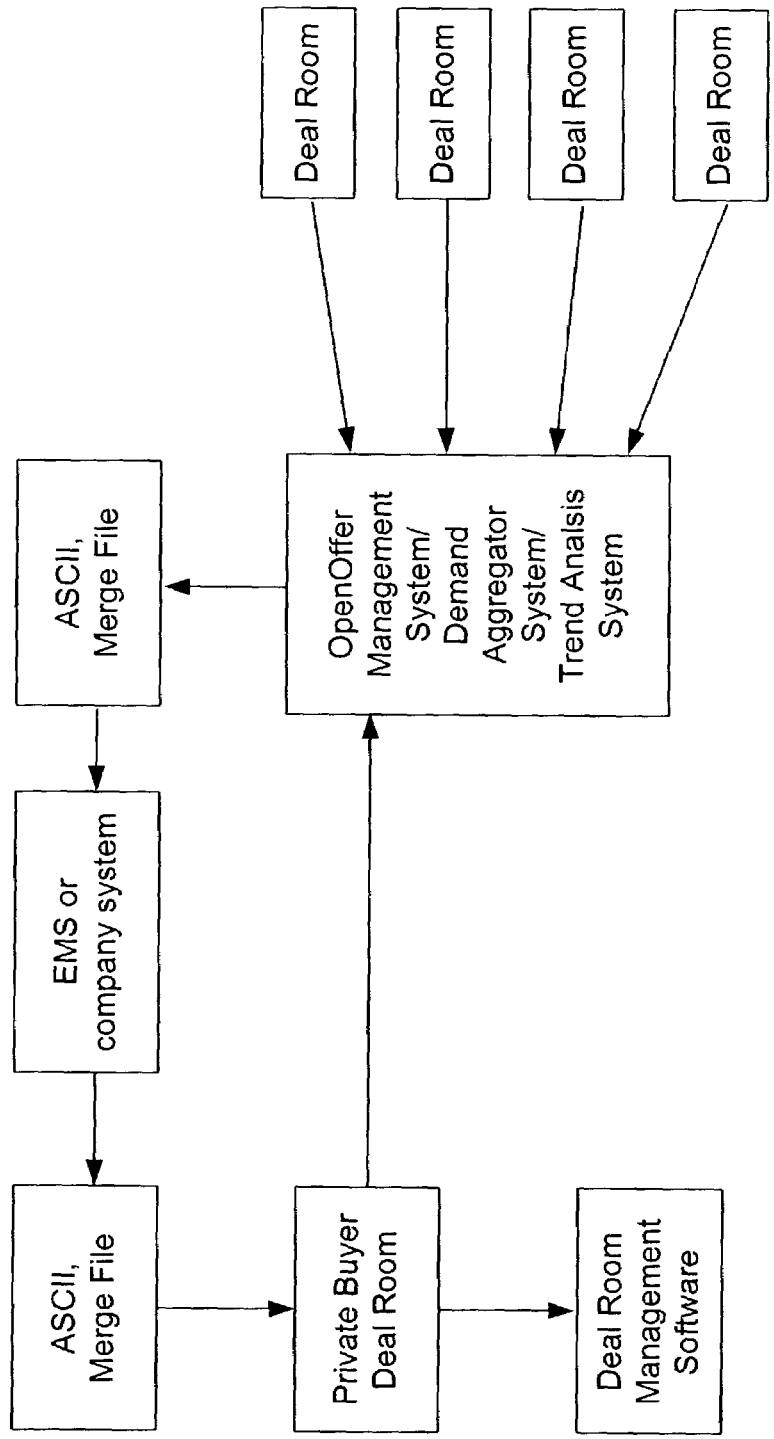
FIG. 12 is a schematic illustration of an ordering process in connection with the above-identified invention.

A buyer place an order on any sponsored site and after placing the order, the buyer can merge the file into an ASCII, comma delimited file. If desired, the merged file can be sent to a specified e-mail account automatically. A merge option will be available for the supplier to select at any suitable time during the purchasing process which will cover purchases made on that site. The merged information will be posted to the e-mail address indicated by the buyer. This feature can be included as a default set-up under a personalized home page, (e.g., MyeWinWin). The feature can be engaged when a buyer creates a default home page and can travel with the buyer from the site to the sponsor site. The personalized home page can be activated whenever the buyer places an order on the sponsor site. FIG. 12 is a schematic illustration of an ordering process.

Dynamic Pricing Model—Buyer Rankings

The previous activity of a buyer on a site is recorded on criteria such as: an amount of cancelled orders (as expressed by a number of %), a track record of on-time payment, etc., until a ranking is assigned to the buyer either manually or by criteria selected by a manufacturer. For instance, a buyer with a 100% rate of taking receipt of all orders online and 100% of paying within 30 days would be assigned a high value such as AA. When this buyer returned to the site and entered a password, the AA rating would be denoted and a series of value-added services would be made available to that buyer such as a 5% discount for placing an aggregated order, special offers such as a rebate of x amount when the buyer is the first to place an order in the aggregated OpenOffer, etc.

In addition, a dynamic price can be assigned to the ranking of a buyer. For instance, buyers can be ranked in various groups such as AA, BB, or CC based on their past history. The AA can be tied to an automatic 5% discount whereby aggregated prices change automatically when the password of that company is entered. A company with a CC ranking could actually see a 5% premium when they visited the same site, simply based on the password and their past performance. The buyer that has a history of canceling may carry a higher cost to the supplier. Accordingly, this cost, can be programmed into that particular buyer's experience on their site. In this way, additional DealRooms may not be required as the same DealRoom will take on the characteristics of that buyer.

The rating of a buyer on one particular DealRoom can be aggregated and averaged along with DealRooms of other suppliers to develop a "buyer profile." This profile can be accessed by supplier to determine what customers visit their DealRoom and what prices they see.

NTE Option

Figure 16:
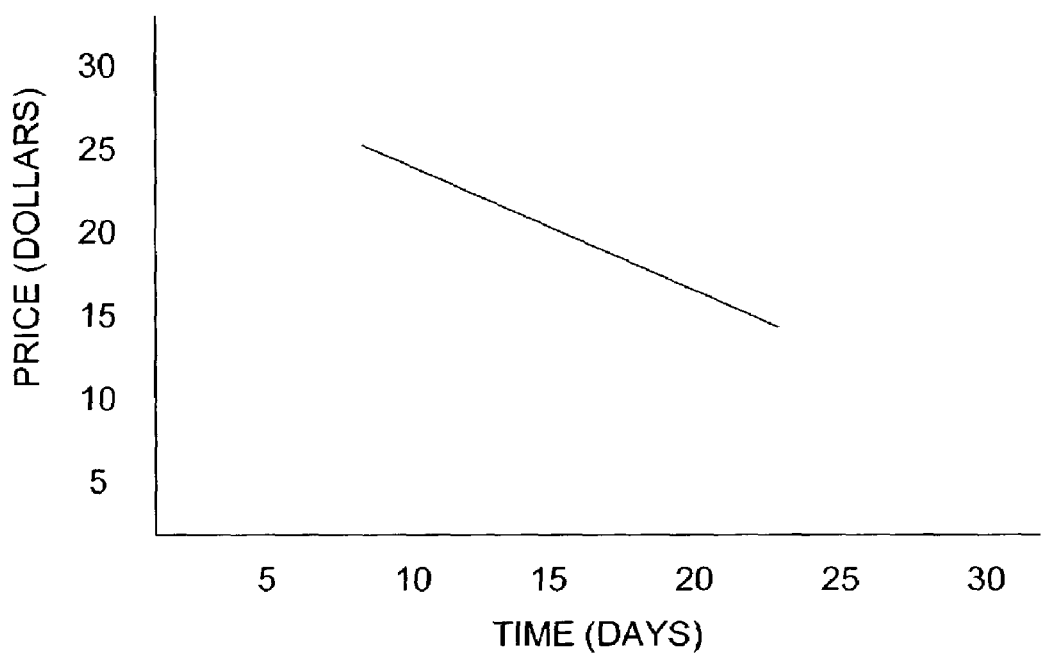
FIG. 16 is an example of a price curve in accordance with one aspect of the present invention.

Turning now to FIG. 16, a supplier can utilize a NOT TO EXCEED option. At 500, a buyer negotiates a NOT TO EXCEED (NTE) price with a supplier for a set period of time (e.g., one year). An NTE tag along with the negotiated price is programmed into a website or into the buyer's profile. The buyer places orders on an aggregated schedule at 510. At the end of the ordering period, a final price for the product and/or service is calculated (520). At 530, if the final price is below the NTE price, the order is executed at the lower price at 540. However, if at 530, the final price is above the NTE price, the buyer is guaranteed that the highest price paid will be the NTE price at 550. The benefits are as follows: the buyer is capable of only bettering the price negotiated at the beginning of the year, the buyer gains the advantage of playing regional prices to their advantage, and the supplier can secure a year-long contract to baseload the business while adding value for the buyer.

Baseload Option

A baseload option status can be given by a supplier to a buyer. The supplier negotiates a product price for a predetermined length of time in exchange for guaranteed acceptance of product orders throughout the predetermined time period by the buyer. Once the buyer accepts shipment over the course of the time period on pre-determined dates, the supplier can then post planned inventory in advance based on this baseloaded business. For instance, if the buyer agrees to accept shipment of 100 racks of glass the first week of every month for the next six months, the supplier then posts the availability of an additional 50 racks of the same glass for the same week. The existing baseload of the original buyer provides a base that absorbs much of the fixed costs associated with the schedule while the incremental 50 racks represents proper capacity utilization at much higher profit margins.

The schedule can be posted in advance at prices that create an incentive for additional orders from other buyers on the site. A NTE price option can also be given to this supplier.

Show Status

A status can be conferred on a buyer as an incentive for the buyer to place orders early in the cycle of a product. For example, a point system can be applied for the buyer. Points are accrued based on when the buyer places an order. The points can result in a year-end rebate or some other incentive. For instance, 5 points can be assigned to a first buyer to order in an OpenOffer sheet, 3 points can be assigned to a second buyer to place an order, and 1 point can be assigned to a third buyer to place an order. It is to be appreciated that points can be awarded to only the first buyer or to any number of buyers as determined by the supplier. Such an incentive creates customer loyalty and rewards buyers beyond the current system of discounts. Similarly, a rating system can also be applied to non-cancellation or proper payment.

Real-Time Price Update Screen

In a real-time price update screen, a buyer can post a series of product categories in a DealRoom with a current price setting and a close date. The DealRoom displays current prices of the product categories provided by a supplier or a group of suppliers, as well as, a respective volume available with the close date. All such information is provided to the buyer and updated in real time. The posted products can be exchanged on an as-needed and customized basis. Likewise, the supplier can have a screen that displays current prices of a plurality of OpenOffers across a plurality of DealRooms and any suitable additional information.

Scheduled Production by Product Category

A supplier can engage a feature in the system to aggregate by various categories, such as product, quantity ordered, ship date, and quantity available. By inputting an amount of available inventory of a product, the supplier can see a production schedule for the product over a specified time period (e.g., week, month, quarter, year). The production schedule can be viewed in graph form with total capacity acting as a backdrop to total production currently booked. However, it is to be appreciated that the production schedule can be viewed in any other suitable form, such as a listing by start date and/or due date. The system is capable of incorporating information from the supplier's Materials Resource Planning (MRP) system in order to determine a total capacity available. Also, a field of total capacity per time period can be included. The system can then return an OpenOffer sheet automatically with the amount of volume available. If desired, the supplier can divided the product offering among a plurality of different OpenOffer Sheets and/or DealRooms. The system can also alert the supplier of the DealRoom with the highest price, historically, and advise where the excess volume should be placed.

Demand Forecast System

Buyers and/or suppliers can have access to historical purchases by a product category. The buyer can utilize the historical information to review product demand schedules.

Alternatively or additionally, the buyer can employ a demand forecast system. The Demand Forecast System employs history information about a product and extrapolates an anticipated demand. The anticipate demand is then automatically placed into corresponding OpenOffer sheets. The OpenOffer sheets can be sent to the suppliers that have indicated an interest in viewing such information for the corresponding product category. The supplier can then determine a volume to offer based on the forecasted demand. A price schedule, or price curve, is determined based on the offered volume and the OpenOffer is submitted to a DealRoom. Accordingly, the demand forecast system mitigates the need for the supplier and buyer to manually calculate or request a forecasted demand.

Reactive Pricing Model

In a reactive pricing model based on product orders, a supplier has an option of lowering a price automatically based on market activity. For example, a supplier of clear glass submits an offer with a set price and volume schedule. If activity for substantially similar products is such that multiple orders have been placed with other suppliers, registered discounts can be triggered automatically. Generally, pricing information of the other suppliers is not available. Thus, the supplier determines whether to change a pricing schedule or to offer discounts based on a volume of product ordered with other suppliers. The supplier may start the pricing schedule at $0.29 per square foot of glass. If a predetermined trigger point is reached (e.g., a specified volume or number of orders are placed with other suppliers), the price can be decreased to start at $0.25 per square foot of glass. Conversely, the price can automatically increase if activity is skewed heavily to the supplier. Thus, if orders are being received sooner than anticipated, the supplier can pull the pricing schedule automatically (either dropping current orders to their lowest point or not) and resubmit the pricing at a different schedule predetermined by the supplier.

The supplier can employ the reactive pricing model in a plurality of DealRooms. For instance, if the glass price in a first DealRoom is priced higher and is being accepted by the customer, the system can automatically alert the supplier and suggest additional volume be placed in the first DealRoom. The program can also allow the supplier to automatically post more products, say a specified amount, to a DealRoom with the highest price. Additional criteria, such as buyer ratings, can be added to this analysis. For example, a DealRoom having a profile of customers that accept orders on-time, pay in a timely manner, and pay a higher price than other DealRooms can automatically be listed as a first company to receive a next available product volume.

In a reactive pricing model based on time left, a supplier can preset dynamic pricing as time elapses on an OpenOffer sheet. For instance, if no orders have been placed for a product or if a predetermined quantity of the products is still available, the price can be programmed to drop by a percentage throughout the remainder of the bid until a price point is reached. The price point can be hidden from the buyers. Accordingly, buyers are encouraged to place orders until the market price has been established.

CRM Package

The demand aggregation system can include a customer relations management (CRM) package. In the CRM package, information on buyers and prospective buyers are loaded into a database that can include information such as:
   Individual name
   Company name and address
   Email address
   Phone number
   Cell number
   Products purchased
   Volumes
   Time of purchase
   Other aspects of purchasing can also be included, such as, times purchased, number of visits before order, price point at first visit, second visit, products ordered, etc.

The system also includes information from the supplier, such as:
   Whether a prospective buyer pays on time (yes or no, or ranking applied, rating, etc.)
   A percentage of business give to a supplier by buyers.
   Whether there is a potential to get more business from a particular buyer. If yes, then buyer joins another group segmented by the supplier.

The CRM package can also include information relating to special offers to buyers (e.g., discounts and/or coupons), which may be in the form of a % off the curve or a new curve if buyer agrees to place an order during this visit.

The cost to service customers can vary according to a variety of factors, such as when an order is placed. For example, the sooner an order is placed, the more beneficial it is to the supplier to plan production to reduce costs of subsequent orders. The earlier an order is placed and the larger the amount, the more value may be created.

Incentive System

One example of motivating buyers to place orders sooner involves an initial offering of lower curves to a group of buyers. The curve (or curves) can "change" according to a pre-determined set of criteria. For instance, buyer A sees a curve as shown in FIG. 16. As orders are placed, the curve can be constant for that group of buyers, or a lower tier can change. This can be specified in advance to the buyers by a supplier.

Figure 17:
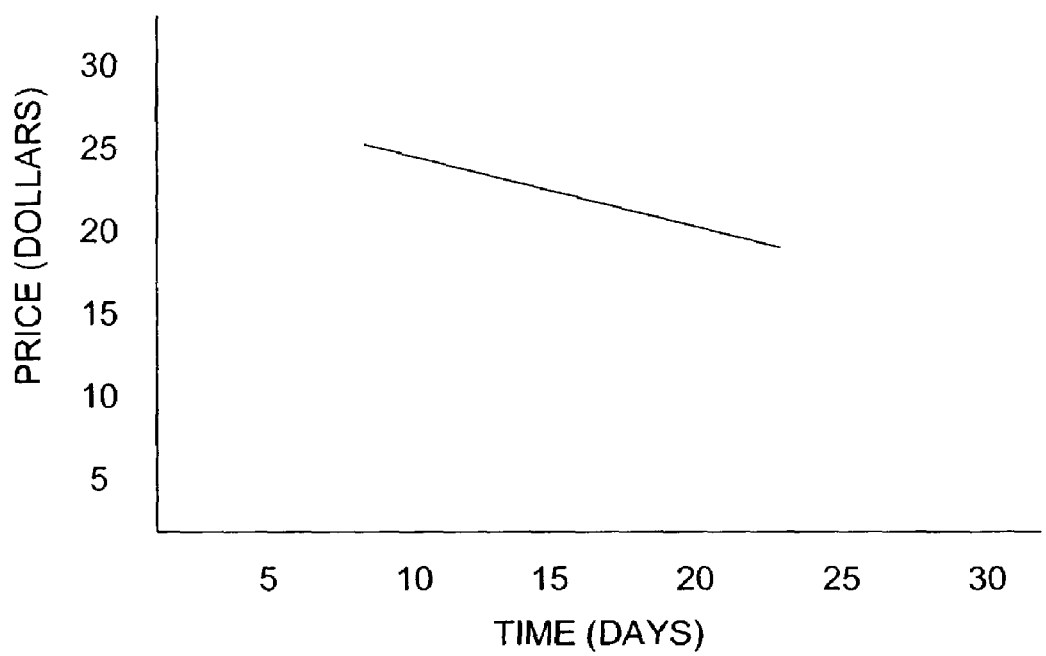
FIG. 17 is an example of another price curve in accordance with one aspect of the present invention.

However, as shown in FIG. 17, subsequent buyers may see a different curve for the same product with any number of variations (e.g., first price is different, price breaks vary, the lower price is changed). This system rewards the buyers willing to place an order earlier and lets the supplier plan a production run in advance.

The CRM package records information for each buyer to assist a customer in setting up custom curves. For instance, a buyer has ordered product A three times over the past six months. The first order was placed when the product price was at $22, the second at $20, and the third at $20. The final price received was $17, $16, and $15, respectively. The next curve the buyer views can automatically be based on the supplier's specification. Examples of such specifications include:
   Past price average over x period of time (number of orders, period of time, etc.) will be the first, middle or last price seen as determined by the supplier
   First price point will be x % above the last order price placed
   Last price received (curve bottom is set x % below that price, initial price is set at x % above the curve top).
   Past price first view
   Past price first order The CRM package can evaluate buyer patterns and tendencies and determine a suitable price curve for each buyer, group of buyers, sub-segment of buyers, etc. Curves can be created in rapid succession when the 'Incentive to Place Orders Sooner' function is initialized and completed by the supplier. Curves can be created around a particular buyer's "experiences" online whatever they may.

A supplier can also designate a Not to Exceed price based on predetermined buyers signing on to the system. For instance, in the previous example buyer A enters the system and is offered a price in a middle portion of the curve as a Not to Exceed price. Thus, the buyer is guaranteed that price at a maximum with the potential to receive a lower price as volume ordered increases. Alerts can be customized based on data collected from the buyer and programmed into the software to correspond with selected products and offers. Alerts can be sent to the buyers via software generated HTML updates and notices of offers in which the buyers are participating and/or are interested.

A buyer can receive special offers, such as "the offer is closing, receive an additional 2% of the total price" to facilitate more sales. Other offers include: "order now and receive free shipping", "5% off the next order or this order", "free storage for x number of days", etc.

The CRM software can record offers made to a buyer and document which offer(s) was successful. This information can be analyzed for buyer patterns and provide input on future curves/new buyer segments, etc. For instance, buyers that ordered at a price point of $20 were 80% more likely to add to the order when free shipping was included. Likewise, data from online questionnaires can be tabulated and presented as part of the buyer profile and utilized in future offers. A buyer who states they like the free shipping feature can be segmented into a group in which that offer is made available; the new price curve may reflect a surcharge for such feature. Conversely, buyers who like a free storage for 30 days option could see a different curve automatically with that a part of the offer. Accordingly, the buyers' behavior and input are employed to automatically present curves that reflect the buyers' wants and/or needs.

Sell Back Option:

Buyers can also buy "futures" of a product. For instance, when a group offer is presented, the buyer can place an order for X quantity; while the supplier retains the right to buy back the product from the buyer. The buyer may be given a lower price for agreeing to such an option. Thus, the buyer can take the product for predetermined time, and the supplier may buy back the product at a same (or different) price if desired.

Price Curve Options:

A supplier can post three curves for the same product and a buyer can select which price curve will be applied to a particular product by accepting different terms and conditions associated with each curve.

Personalized Offers

Buyers can receive personalized offers, such as, place order now, place order on your next visit, place order within x period of time, add to your initial order and receive X % more off this purchase or receive a deeper discount curve, One Click Add A buyer can add to a previous order without returning to the order site. An HTML message via voice mail, pda, cell phone, etc. can be generated and sent to the buyer The message displays the price curve for the order and the total volume ordered and/or available. Then buyer can then be directed to the curve's order form (or complete fields presented in the message) and add to the initial order. The system updates the order automatically, posts the new volume on the purchase order and updates the curve at the substantially simultaneously. Likewise, special offers can be delivered via this same medium. For instance, a special offer for a buyer to order now and receive 3% off the price of the product can be presented for following the link.

One Click Extend

With an option to extend the product offer, a supplier can select an icon to open a curve's close date. The supplier can be prompted by an automatic message to extend the offer. The message configured to be sent out to the supplier within a specified period of time in relation to the offer close date (x days before close, a few hours before close, etc.). If the supplier decides to extend the offer period, an automatic alert is generated to inform buyers of the extension.

The extension notification can also be sent to buyers listed in the supplier's CRM system that have or have not visited the offer. The notification can include a price curve along with the extension and current price and volume information. Moreover, a special offer can be included as well to provide extra incentive for buyers to place an order. If the buyers are registered, they place an order via an HTML notice.

Order changes can also be made via the notification system. For example, the supplier can specify a new minimum order quantity or any other product detail, which will change the offer detail accordingly for future purchases. Further, once a minimum quantity is reached in an offer, the supplier can change the price curve. Accordingly, future buyers may see different starting, middle and ending price figures than current buyers.

Spot Curves

Figure 18:
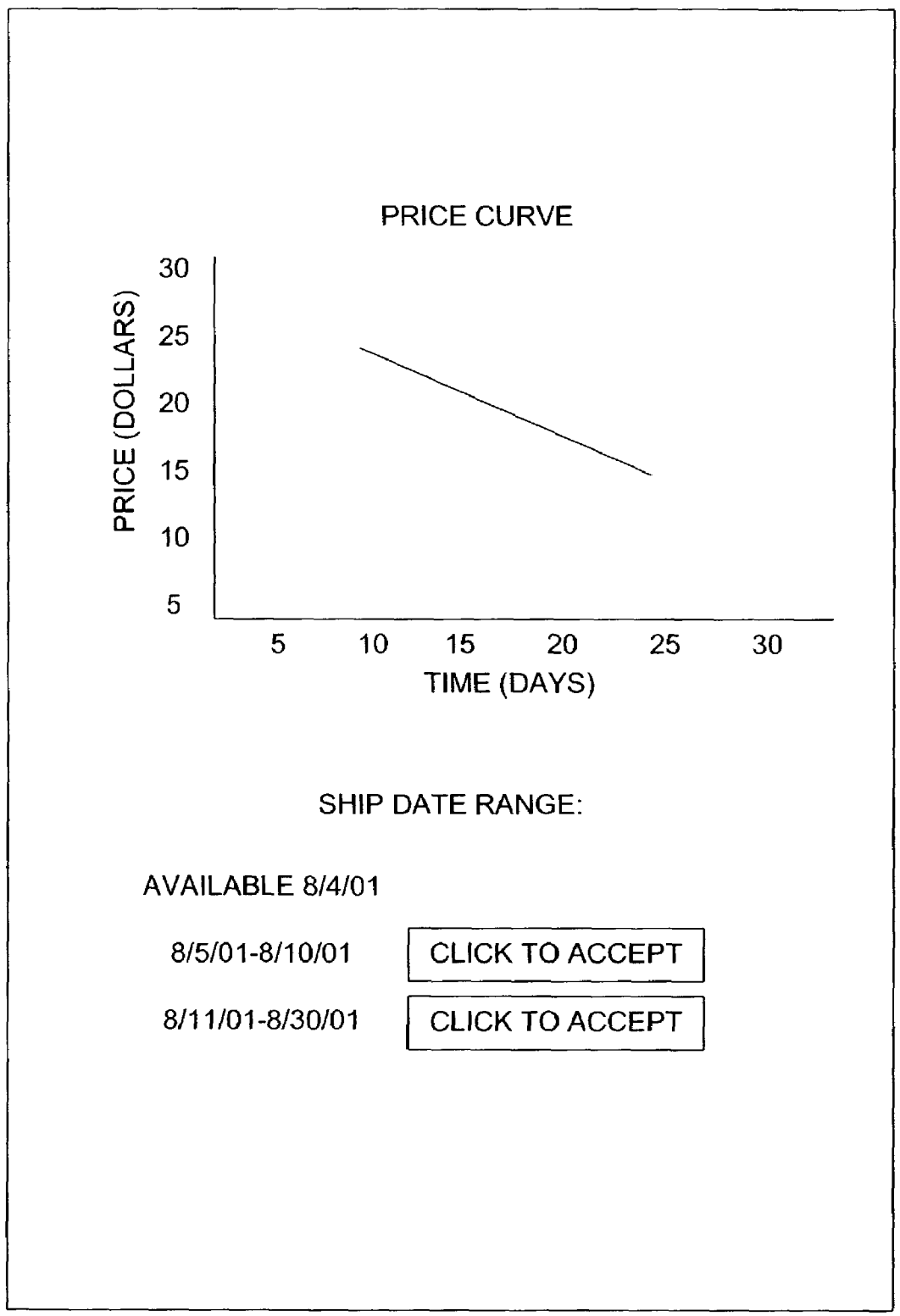
FIG. 18 is an example of a spot curve in accordance with one aspect of the present invention.

A supplier can create spot curves, as shown in FIG. 18. Spot curves are beneficial when inventory is high and the supplier wishes to move product. In this case, an offer can be extended for a period of time. A buyer may come in and place an order for the product and then take the product immediately or along the period assigned. The final price will be determined at the end of the order period which may come after the product is already at the buyer's location. Spot curves can be sent to buyers via the CRM package to offer buyers additional incentive to place orders early.

The buyer can change the offer accept date. The system will calculate a new price based on the underlying carrying cost and send an alert to the buyer. For instance, a buyer places an order for 20 tons of steel and specifies that 10 tons are to be delivered on the $10^{th}$ and the other 10 tons are to be delivered on the $30^{th}$. A shipping location is identified to specify whether the two shipments need to go to the same or different locations. The total order price is calculated based on the total product order and the seller may choose to place a shipping surcharge on top of the order. Then, as more buyers order, the price drops according to the price curve. A ship icon can be utilized to present the transportation costs and a total icon can be used to present the total costs to the buyer.

A supplier can offer products according to a specific date range (e.g., week) or by a particular date. Further, costs can be incurred per day or even per hour, on each ship date. A 'change ship date' option is presented to the buyer if the dates offered are not acceptable. Other order information, such as quantity ordered, shipping location, order number, delivery date, etc. can also be modified in a similar manner. If the change(s) is outside of a predetermined range, as determined by the supplier, a cost can be levied to the buyer requesting the change. For example, if the date specified is in such a range that carries a surcharge, then the buyer would be billed the extra cost (a calculation can be set by the measured quantity such as tons and the carrying cost per day associated with that unit). This is an optional feature that can be turned on or off dependent upon the supplier and what "groups" of buyers have such a feature engaged. Further, the feature can be turned off during the offer and an HTML can be sent to buyers letting them know the order can be placed and they will not be charged for storage up until x date. This is a semi-automatic or automatic feature that is embedded in the software.

A shipping icon can flash once an order has been placed asking the buyer if they would like to arrange for shipping at this time. The current price per mile or other form of pricing can be presented.

One Click Change Order

A buyer can click on an icon that directs them to his/her order page in which the buyer can change the options of the product selected. For example, a buyer may place an initial order for 50,000 units without specifying any or all of the options and/or details associated with the product. Later, the buyer can return and specify one or more of the options, ship dates, etc. for the products.

Change Quantity

A change quantity feature allows a buyer to change the amount of products ordered. However, the price curve may not change for the group of buyers that have already ordered. Accordingly, changes in slope, price, quantity available, etc. for the other curves are affected. Surcharges can be levied based on the supplier's decision.

Automatic Price Curves

A first price for a product may be $25 and a final price for the product may be $15. The software allows a supplier to define such prices along with a volume and a price curve that automatically calculates price breaks. The supplier initially specifies the breaks that should be calculated, such as 2 or 3. Additionally, the supplier specifies the shape of the curve (e.g., shallow, steep) and the curve is automatically generated. In yet another example, the supplier can have a default price curve already established in the software. It is to be appreciated that any automatically generated curve can be overridden by specifying the desired values.

Another example of an automated price curve is one in which every order reduces the total price. With this curve, every minimum order (if set), drops the product price. For instance, the supplier establishes top and bottom prices along with the volume. As every order is placed, the curve automatically reflects a decrease in the current price. The curve can also change slopes to reflect a deeper curve at the beginning, and a shallower curve near the end of the order period. A supplier specifies the type of curve (an icon with different slopes can be presented and the supplier simply has to click on the slope of choice and the prices will calculate automatically). With this option, buyers are required to wait for a larger incremental volume is reached before receiving a lower price.

This automated curve can also be introduced into the initial price curve. The initial curve starts out with segments. Buyers are notified (e.g., via HTML) that the offer has been modified such that every order reduces the price. This option to change an order and update a set of customers is provided with an icon. A minimum quantity can also be changed to correspond with the new curve. Multiple curves can be linked and de-linked at any suitable time by the supplier.

One Click Price Break

New price breaks can be introduced by a supplier with a single click of an icon. All buyers, specified buyers, and/or those buyers who haven't seen price curve yet, etc. can be notified of the new price curve. A buyer can have access to the changes made by a particular supplier. For instance, in a buyer's DealRoom the information on the supplier's changes to curves, segments, prices, different buyers, etc. can be displayed and analyzed.

Buyer Information

The supplier can make historical product information, such as the average price for a product over the last X number of offers, time, etc. available to a buyer or group of buyers. The information can be listed in its entirety, or in some form as controlled by the supplier and/or buyer. The information can be raw or analyzed. For example, probabilities such as, there is a 70% probability the next price tier of x dollars will be reached with the margin of error displayed, can be calculated and shown to the buyers. Additionally, a "last five prices" (or any other variation) can be shown for this item in a quick view format such that the buyer can access previous price points in the DealRoom for the requested product.

Supplier Alert System

If a predicted % of probability is not holding true on an order, an alert system can inform the supplier of a variety of options (e.g., drop price curve, shill order, offer special curve to certain buyers (e.g., a profile buyers)).

The supplier can view a number of customers that have visited the DealRoom and have not placed orders relative to a number of buyers who have placed orders. The price points for the buyers can be displayed in a table (e.g. Buyer A—viewed product B at the price points of $54 and $52—the dates, etc.) where individual buyer information can also be accessed. The data shows the supplier the activity level that can be compared to previous offers and correlated with the projected volume based on the activity to date.

Integration of CRM, ERP (production scheduling) and DAS

Figure 19:
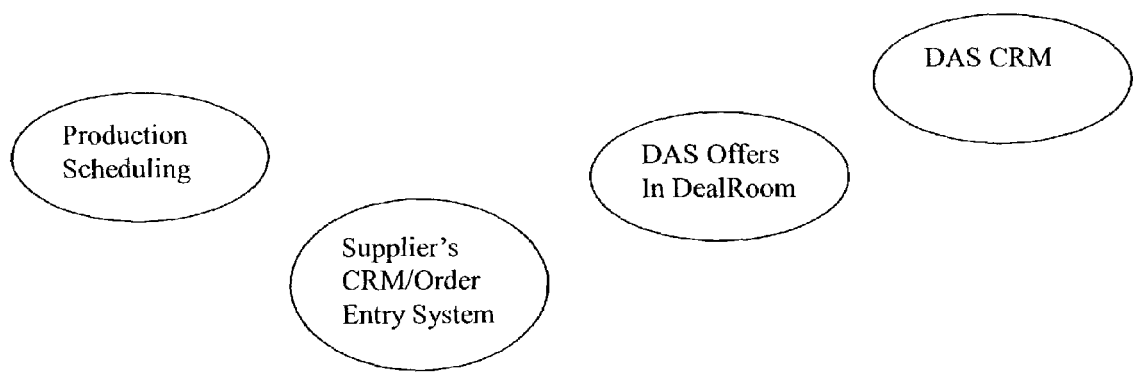
FIG. 19 is an example of a demand aggregation system in accordance with one aspect of the present invention.

The following section describes an example of how production scheduling, the supplier's CRM package, Enterprise Resource Planning (ERP) system and DAS can interact, as shown in FIG. 19, to add value for buyers and suppliers.

For instance:

A production run can be scheduled for six weeks from now for product B with options X and Y available. The total quantity to be produced is x, and x+300 is the optimal run. The scheduler can indicate this to the Product Manager/Sales Manager etc. with the notice: Do we post the remaining quantity in the DealRoom? Or, the software will be written to automatically post these offers to the DealRoom with the same ship date, fob point, etc. populating accordingly to the buyers listed in the DealRoom/CRM package. Once the curve is created and confirmed (automatically or semi-automatically by the other party), the curve is posted in the DealRoom and alerts for the appropriate buyers (as listed in the CRM) and other suitable people (e.g., sales, inside customer service) are sent. Multiple curves may be sent, linear offers may be prepared (e.g., display curve 1 for 24 hours, if not takers post curve 2, etc.) or any number of other features may be included as listed in this patent application and other applications. Further elaborating on this feature, the software can be configured with a series of if, then instructions:

Post to first buyer—price curve A

Post to second set of buyers—price curve B

Post to third set of buyers—price curve C

The system allows the supplier to change sequence and time between offers. For example, if a first offer is made for A and no orders or predetermined thresholds have been met, the B and C may be offered concurrently with linked curves.

An order received online in the DealRoom can automatically populate the production schedule with quantity ordered and other specifics via order entry software. Likewise, if an order originates through the order entry system, the change is automatically reflected in the DealRoom. A "stimulus" event would impact the other parts of the system, and price out the available capacity. Likewise, cancelled orders/changes to production runs would change the offers and order entry data. If a total quantity has been ordered, a notice is sent to production regarding additional capacity/quantity.

A change in the production schedule can also alert a Marketing/Sales Manager of available capacity such that it can be reflected in the current curve. The cost curve for the product is also available for viewing. The manager can determine what price curve should be set. Also, customer feedback as to when the buyer would like to receive the next order can be tabulated and sent to the production manager. The production manager can enter product information into the schedule and agree to run quantity. The Marketing Manager is notified and can approve of the offer specifics and the buyers to be contacted. The order entry software is then population with the information and displayed on the screen for internal order takers/sales representatives.

Customer data collected from the order entry system can be shared and input into the CRM package for data analysis. Buyer spending limits can be set in the order entry system and carried across to the DAS DealRoom. A credit system/amount available can also be referenced in the software and indicated to the buyer and supplier. Thus, if a buyer attempts to exceed a set spending limit, an alert is sent to the buyer and/or seller and the order is not placed.

One Time Only Curves

A supplier can post curves that may be pulled at any time. Buyers are aware of this risk and thus, may not choose to plan their production on this availability. A guide can be provided to the buyers on the types of curves that can be presented and what the terms and conditions are of each different type.

Multi-Dimensional Curve

Figure 20:
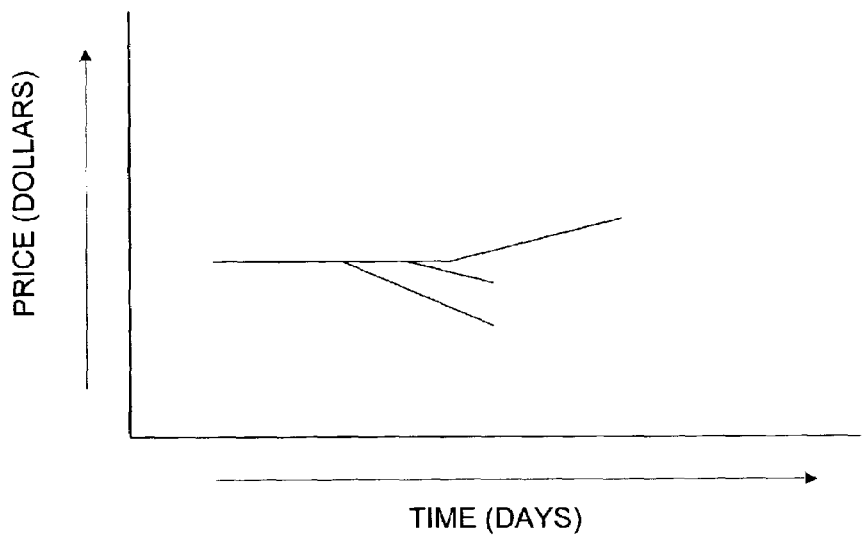
FIG. 20 is an example of a multidimensional price curve in accordance with one aspect of the present invention.

An example of a multi-dimensional curve is shown in FIG. 20. In this example, a buyer is encouraged to place an order early in the order period. Here, the buyer can see that the earlier an order is placed, the better the curve and final price. Suppliers of seasonal products may benefit from such a system. The curves can be dynamic, adjusting as set by the supplier and as demanded by the buyer(s). If products are scarce or pricing is unknown, the supplier may offer multi-dimensional curves, to entice buyers to provide a pricing floor. The curves can be later modified (higher or lower) and the original, or earlier, curve is removed from view for future buyers.

A Not to Exceed option can also be placed in this model. The NTE option guarantees that a buyer will never pay more than the existing price, even if the prices increase during the order. Further, if the prices decrease, the buyer can take the lower price.

Option to Buy

A buyer can purchase an option to buy the product during an open offer. For instance, the buyer can pay a fee or place a request to hold a slot in a supplier's production schedule for X pieces of product A. The supplier may post certain restrictions such as a restricted time frame, a maximum quantity, etc. If the option is exercised, then the price is confirmed. If the option is not exercised, the supplier can sell the extra quantity to another buyer but may still collect a fee from the buyer that made the hold request.

Seasonal Price Curve

Figure 21:
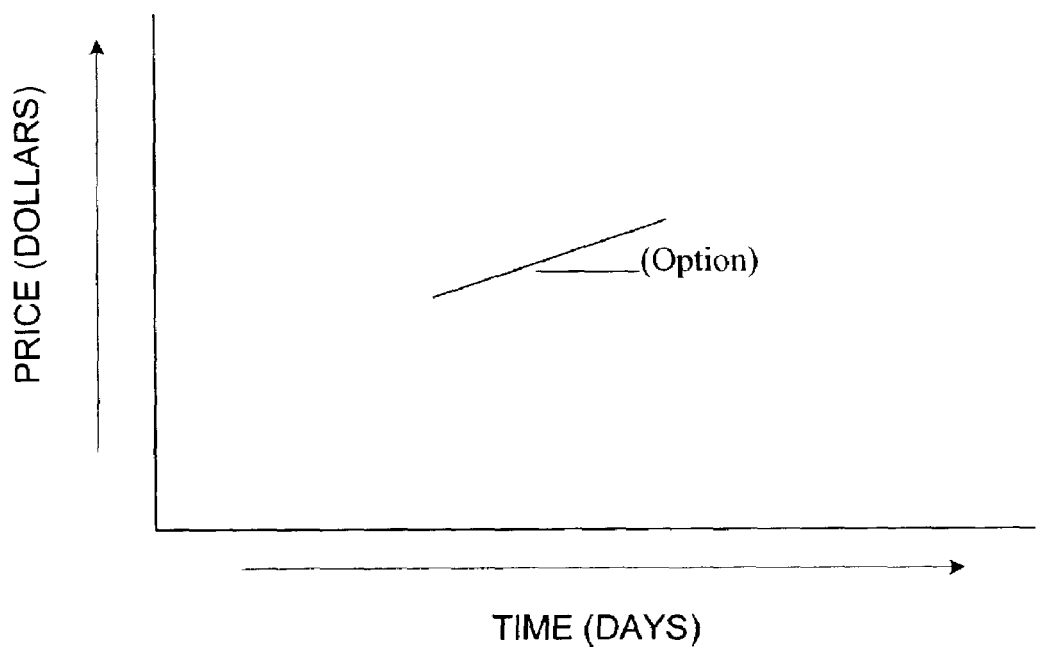
FIG. 21 is an example of a seasonal price curve in accordance with one aspect of the present invention.

Another example of a curve is shown in FIG. 21 and is one that is set in advance and is time-sensitive. Offshoots tied to volume may or may not be included at during the offer.

Third Party Production Schedule

Generally, setting up a production line and producing product is a costly venture, especially if volume is unknown or the run length is incomplete. Using the demand aggregation system, a supplier can have a third party underwrite the cost of the production run if certain volumes are not ordered. Based on archival data, a third party can set a risk assessment and tie a financial figure to it. The software can then record a required figure and volume.

For example, if a predetermined volume is not reached at the end of a production run, a third party carries the burden of paying the supplier. However, if the predetermined volume was reached, then the third party would keep the payment. Partial volumes could also dictate a level of the payment released by the third party. Accordingly, a form of insurance is purchased by the manufacturer. These contracts would be available for common trading among third parties. Other factors which may be used in this example are: post production run, ship date, FOB point, product, quantity, history, the right to purchase X of product A within a specified period . . . option price of X. Buyers can also participate, being able to buy options to purchase X amount of product.

Figure 22:
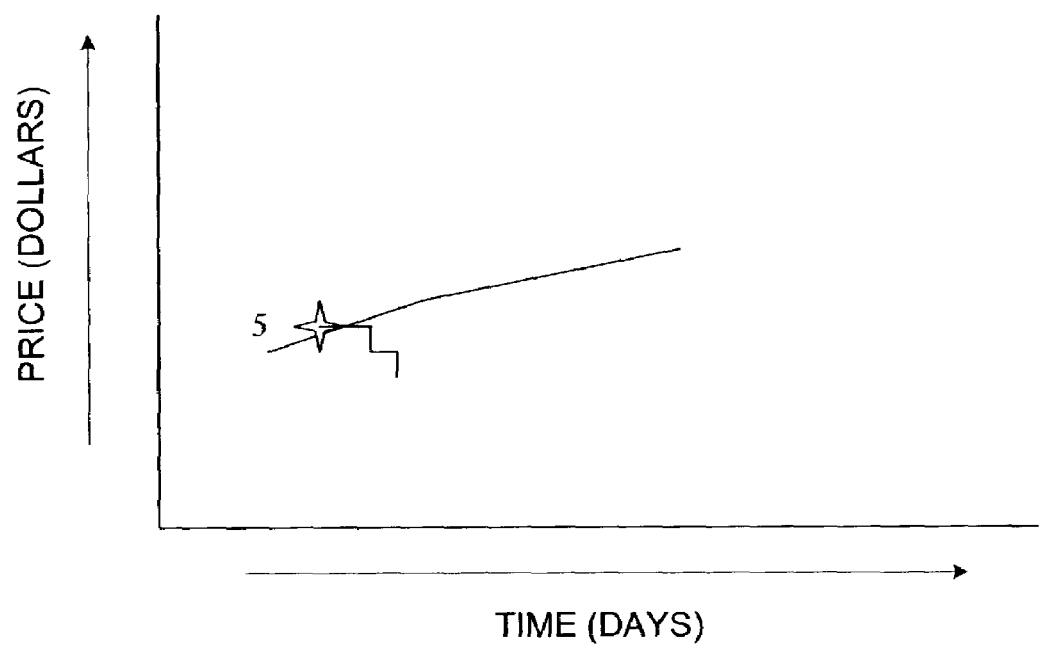
FIG. 22 is an example of another price curve in accordance with one aspect of the present invention.

Another variation on the price curve is shown with respect to FIG. 22. Here, if an order is placed at a certain point, every other order placed by buyer will drop the price by x %.

Software

System screens are configured such that one can easily determine what is being displayed. Distinguishing characteristics can be made utilizing colors, icons, and other suitable visual displays. For example, if users are only authorized to view two different curves (Forgers and Service Centers), the users can distinguish the curves by selecting the desired curve. When they log on, a drop down box on a first page (home page) would display the option of viewing Steel Centers, Forgers, or any contract price people. The users can be given read only or write access to the different systems. Additionally, the users can view the different curves offered in the system. To distinguish, rather than color, an extra field could be added in the aggregated offers page. This field would provide the company name, or name of the group of buyers that were able to see this specific curve.

Auto-Post and Re-Post Feature

For example, a supplier has posted an aggregated offer for ship date Y. An order enters the system from a buyer with a different ship date X specified (could be the internal ERP system, other order entry system). The order is taken and the system determines there is a new ship date with an X ship date. The system references the new ship date with the old. The system can be programmed to defer to the new ship date by a number of criteria (such as by the customer who ordered the product, the amount ordered, etc.). If so, the program can be set to automatically do the following:

If there are no orders for ship date Y, the system changes the ship date to X and can notify the buyers accordingly.

If there are orders for ship date Y, the system alerts those buyers via phone, fax, PDA, email, etc. of the change in ship date. If the buyer confirms the new ship date is acceptable, the order is added to offer X. An incentive (3% off your final price if you accept, etc.) may be offered by the system (as programmed by the supplier). Another option would be the buyer refuses to accept the discount for the ship date. The buyer can then cancel the order via the system, or the supplier can honor the ship date of X as well as Y. The supplier can also automatically post the new ship date (X) in the DealRoom.

Change in Minimum Order Quantity

Product Offers are set up with a minimum order quantity to simulate normal business practices. DAS also allows an Offer to be configured with a multiple minimum order quantities. Once the volume on a particular offer reaches a predetermined level, the minimum order quantity can be lowered (or presumably, raised).

For example, an offer for 12L14 bar could be set up with an initial minimum order quantity of 10 tons. Once orders have been placed totaling 100 tons, the minimum order quantity could be lowered to 5 tons automatically. These minimums, as well as any other option in the offer, can be created and/or modified by the supplier for individual customers and tied to their particular name and password.

Customer-Determined Offer Availability

Product Offers are generally determined by the supplier. However, DAS has the capability to survey buyers of a product. The buyer can indicate a desired purchasing schedule, indicating the types of products, product options, quantities and delivery dates. Using this information, a supplier can determine a production schedule that meets their internal goals, while accommodating customer demand.

New Offer Notification

As new offers are created, DAS can aid with the marketing and promotion of those offers. During the offer creation process, DAS will notify the Action Manager of two potential pools of customers. First, DAS generates a list of customers who have purchased that particular product before. Second, DAS will generate a list of potential customers, based on the survey data of registered buyers. Using these two lists of buyers, the Supplier can then create a targeted marketing program. The group is given a "name" by the supplier with the ability to click on a pre-set email/html to send to the group, automatically fax certain customers based on their preference, etc. A buyer with a particular product tagged will automatically or semi-automatically receive html alerts whenever the product has been ordered.

New Pricing Notification

As orders on offers are placed, prices fall based on the pre-determined price curve. As prices fall, the demand aggregation system can generate different lists of customers, such as: those who have already placed orders; those who have purchased that particular product before; and potential customers based on the survey data of registered buyers. The supplier is notified of the price reduction and presented with the list and can elect to notify any or all of the groups to the new price (and savings) via email or fax.

The supplier has the ability to alter the curve in one of the DealRooms to those buyers who have not yet seen the curve. For instance, 40 buyers have access to a DealRoom. 5 buyers have visited with 2 placing orders. The curve will stay the same for this group of 5 (or two if the supplier wishes to engage this option). The new curve will change according to input from the supplier (let's assume it is higher, but it also could be lower). Now, when the remaining buyers (35) visit the DealRoom, they will see only this new curve (with the volume of the two included to reflect an aggregated purchase in process). Likewise, the HTML notices generated from this DealRoom will automatically have this group separated and tagged.

Those buyers who either saw the first curve would still see the curve they saw earlier. The new buyers would see a different curve. Volume ordered by each would be reflected in the other curve. The supplier can change a curve in mid-offer without upsetting any customers. The profits would be higher with the real-time flex-curve and new buyers still benefit from aggregation (initial starting points, volume discounts, total volume, etc. could be changed by the supplier in real-time).

Instant Order Form

A buyer can receive a real-time HTML alert notifying the buyer of the current price. An icon may then appear that allows the buyer to click on this to order immediately. The system allows the approved buyer to bypass the front page (name and password sections) and the other pages in between, and be at the order page. The buyer simply enters the order (or adds to the already placed order) with a single key-stroke.

Tethered Price Curve

Every buyer is given a % off the price of a product along with a scheduled discount curve based on total volume ordered. The buyer's discount follows the buyer throughout the DealRoom and by product. As more volume is ordered for a particular product, (e.g., 100 tons), the buyer would experience the discount from their own price volume curve. In this way, 100 buyers could have 100 price curves while still aggregating their demand on the same curve. Buyers are tethered off a production volume tied to a certain ship date or period.

Changing-Tethered Price Curve

The % off could also change according to time or any other criteria selected by the supplier (product, fob point, volume, etc.) If the buyer has not ordered yet, a personal discount may be reduced as more orders come in. Conversely, if few orders are placed, the buyer may see an increase in the discount curve until he orders. Once he does, his particular price curve is "locked in" for the remaining offer time.

Master CRM Dashboard—Managing Multiple Supplier's DealRooms

A significant component in applying demand aggregation via DealRooms is coordination. To resolve this need, a Master CRM Dashboard was created to enable a single customer support person (CSP) to view multiple DealRooms, and the particulars given here and more, from a single screen and provide changes automatically on behalf of suppliers. Literally thousands of DealRooms and price curves can be viewed with access to a single screen. The CSP is able to see a split screen of access categories: customers, companies, teleCRM (see next section) reporting tools, and administration. The CSP is able to manage and design customer registration pages for the DealRooms, change access rights for sales representatives and buyers alike, change terms and conditions for each DealRoom, and literally perform activities related to managing the DealRooms including the reporting tools that enable the CSP to access order information and the details described earlier, a billing module to calculate the fees generated from the volume in each of the DealRooms (transaction fees can be set for each DealRoom and recorded in the software) and the presentation method (present an e-bill or paper bill) automatically to the supplier.

Changes made to DealRooms are recorded in an activity log, which is viewable by a corresponding supplier or group of suppliers. Likewise, email alerts are automatically triggered when certain events have happened (e.g., change to price curve). The supplier can determine and set up which events to include an automatic trigger.

TeleCRM—Managing Multiple DealRooms and Generating Price Curve Quotes

Another option within the demand aggregation software is the integration of call notes with customers, action items, attachments, etc. with the screen viewed by CSP and/or third parties (e.g., telemarketers). A registration form is completed for a particular DealRoom. The buyer (or telemarketer on behalf of the buyer) completes the relevant information including, for instance, volume purchased monthly and the options usually ordered. Based on this information, the registration form is completed and a price curve is created automatically (Note: In creating the DealRoom, the supplier provides a base "price curve list" that is saved and used to assign price curves to newly registered buyers based on any number of criteria.) The system takes the information completed and generates a price curve for the buyers. A name and password can be sent in an email to the buyers including a link to view the price curve quote, or instructions to enter a name and password to see the price curve.

TeleCRM Customer Profile

A price curve can be automatically saved to the buyer's profile in the CRM package along with any notes made by the caller. Any other correspondence is also automatically saved to the customer file and can be accessed accordingly. Other features of the CRM software include: searching by name, company, DealRoom name, volume, notes section, next call scheduled, profit opportunity of customer ranked in descending order, group rank of customer, buying activity of buyer, competitor's name, etc.

The present invention may be implemented via object oriented programming techniques. In this case each component of the system, could be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors which the developer then customizes to meet particular needs.

In particular, an object includes, and is characterized by, a set of data (e.g., attributes) and a set of operations (e.g., methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

The present invention can employ abstract classes, which are designs of sets of objects that collaborate to carry out a set of responsibilities. Frameworks are essentially groups of interconnected objects and classes that provide a prefabricated structure for a working application. It should also be appreciated that the PCM and the shared memory components could be implemented utilizing hardware and/or software, and all such variations are intended to fall within the appended claims included herein.

According to an exemplary aspect of the present invention, Java and CORBA (Common Object Request Broker Architecture) are employed to carry out the present invention. Java is an object-oriented, distributed, secure, architecture neutral language. Java provides for object-oriented design which facilitates the clean definition of interfaces and makes it possible to provide reusable "software ICs." Java has an extensive library of routines for copying easily with TCP/IP protocols like HTTP and FTP. Java applications can open and access objects across a network via URLs with the same ease to which programmers are accustomed to accessing a local file system.

Furthermore, Java utilizes "references" in place of a pointer model and so eliminates the possibility of overwriting memory and corrupting data. Instead of pointer arithmetic that is employed in many conventional systems, the Java "virtual machine" mediates access to Java objects (attributes and methods) in a type-safe way. In addition, it is not possible to turn an arbitrary integer into a reference by casting (as would be the case in C and C++ programs). In so doing, Java enables the construction of virus-free, tamper-free systems. The changes to the semantics of references make it virtually impossible for applications to forge access to data structures or to access private data in objects that they do not have access to. As a result, most activities of viruses are precluded from corrupting a Java system.

Java affords for the support of applications on networks. Networks are composed of a variety of systems with a variety of CPU and operating system architectures. To enable a Java application to execute anywhere on the network, a compiler generates an architecture neutral object file format—the compiled code is executable on many processors, given the presence of the Java runtime system. Thus, Java is useful not only for networks but also for single system software distribution. In the present personal computer market, application writers have to produce versions of their applications that are compatible with the IBM PC and with the Apple Macintosh. However, with Java, the same version of the application runs on all platforms. The Java compiler accomplishes this by generating byte code instructions which have nothing to do with a particular computer architecture. Rather, they are designed to be both easy to interpret on any machine and easily translated into native machine code on the fly.

Being architecture neutral, the "implementation dependent" aspects of the system are reduced or eliminated. The Java virtual machine (VM) can execute Java byte codes directly on any machine to which the VM has been ported. Since linking is a more incremental and lightweight process, the development process can be much more rapid and exploratory. As part of the byte code stream, more compile-time information is carried over and available at runtime.

Thus, the use of Java in the present invention provides a server to send programs over the network as easily as traditional servers send data. These programs can display and manipulate data on a client computer. The present invention through the use of Java supports execution on multiple platforms. That is the same programs can be run on substantially all computers—the same Java program can work on a Macintosh, a Windows 95 machine, a Sun workstation, etc. To affect such multi-platform support, a network interface 105 and a network browser (not shown) such as Netscape Navigator or Microsoft Internet Explorer may be used in at least one aspect of the present invention. It should be appreciated, however, that a Java stand-alone application may be constructed to achieve a substantially equivalent result. Although the present invention is described with respect to employing Java, it will be appreciated that any suitable programming language may be employed to carry out the present invention.

An Internet explorer (e.g., Netscape, Microsoft Internet Explorer) is held within the memory of the client computer. The Internet Explorer enables a user to explore the Internet and view documents from the Internet. The Internet Explorer may include client programs for protocol handlers for different Internet protocols (e.g., HTTP, FTP and Gopher) to facilitate browsing using different protocols.

It is to be appreciated that any programming methodology and/or computer architecture suitable for carrying out the present invention may be employed and are intended to fall within the scope of the hereto appended claims. The invention has been described with reference to the preferred aspects. Obviously, modifications and alterations will occur to others upon reading and understanding the preceding detailed description. It is intended that the invention be construed as including all such modifications alterations, and equivalents thereof and is limited only by the scope of the following claims.

INDUSTRIAL APPLICABILITY

The subject invention has industrial applicability in at least the fields of computer systems, networks, and electronic commerce.

What is claimed is:

1. A business transaction method, comprising:
maintaining buyer profiles in a data storage device;
deriving a plurality of customized price schedules for a product based on at least one buyer profile, each of the plurality of customized price schedules varying in accordance with a quantity of the product ordered from a plurality of deal rooms;
electronically offering the product for sale in at least one of the plurality of deal rooms, the product being offered in each deal room in accordance with at least one of the plurality of price schedules; and
displaying a listing of at least one of the plurality of deal rooms in which the product is offered when at least a subset of criteria indicated for a product search matches criteria describing the product.

2. The business transaction method of claim 1, further comprising providing an incentive which modifies at least one of the plurality of price schedules so as to motivate a plurality of buyers to place orders for the product sooner.

3. The business transaction method of claim 2, the incentive being determined by analyzing buyer patterns.

4. The business transaction method of claim 3, the incentive including at least one of offering an initial lower price schedule, free shipping and free storage.

5. The business transaction method of claim 1, the product being electronically offered for sale over the Internet.

6. The business transaction method of claim 1, the buyer profile being created in part from a registration survey.

7. The business transaction method of claim 6, the buyer profile being determined in part by information provided by suppliers.

8. The business transaction method of claim 1, electronically offering a product for sale being limited to an open session period corresponding to a time during which orders to purchase the product are accepted.

9. A computer readable medium with computer executable instructions stored thereon, the computer executable instructions being executed to perform the method of claim 1.

10. The business transaction method of claim 1, at least one of the plurality of deal rooms being sponsored by a buyer or a plurality of buyers, at least one of the plurality of deal rooms being sponsored by a seller or a plurality of sellers, and at least one of the plurality of deal rooms being cosponsored by both a buyer and a seller.

11. A computerized system for electronically transacting business, comprising: at least one computer, the at least one computer comprising:
a customer resource component for identifying potential customers based on customer profiles stored in an electronic storage device;
a demand aggregation component that populates a seller's product production schedule with orders placed by a paying customer in a deal room that electronically offers a product for sale to customers retrieved by the customer resource component in accordance with a price schedule, the price schedule setting a price for the product which varies in accordance with a quantity of the product ordered; and a supplier alert component that monitors the potential customers that have visited the deal room and the paying customers to determine a probability that a target for the production schedule will be met; wherein each of the components comprises computer hardware, or one or more computer-readable media including computer instructions which, when implemented, cause at least one computer to carry out the functions of the component, or computer hardware in combination with such one or more computer-readable media including such computer instructions.

12. The system of claim 11 further comprising an incentive component which modifies the price schedule so as to motivate a plurality of buyers to place orders for the product.

13. The system of claim 12, the incentive component modifying the price schedule based at least one customer profile.

14. The system of claim 11, the customer resource component receiving information about customers' responses to offers from the demand aggregation component.

15. The system of claim 14, the customer resource component saving customer response information to the customer's profile.

16. The system of claim 11, further comprising a display to allow a seller to view deal room activity.

17. The system of claim 16, the display includes information that pertains to the number of customers that have access to an offer for the product.

18. The system of claim 16, the display includes information that pertains to the number of customers that have accessed an offer for the product to date.

* * * * *